US009379623B2

(12) United States Patent
Zhang et al.

(10) Patent No.: US 9,379,623 B2
(45) Date of Patent: Jun. 28, 2016

(54) SYSTEMS AND METHODS FOR DYNAMIC THRESHOLD ADJUSTMENT WITH PRIMARY-SIDE SENSING AND REGULATION FOR FLYBACK POWER CONVERTERS

(75) Inventors: Yunchao Zhang, Shanghai (CN); Jinya Dong, Shanghai (CN); Xiuhong Zhang, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 76 days.

(21) Appl. No.: 13/052,869

(22) Filed: Mar. 21, 2011

(65) Prior Publication Data

US 2012/0195076 A1    Aug. 2, 2012

(30) Foreign Application Priority Data

Feb. 1, 2011    (CN) .......................... 2011 1 0034669

(51) Int. Cl.
*H02M 3/335*    (2006.01)
*H02M 1/00*    (2006.01)

(52) U.S. Cl.
CPC .......... *H02M 3/33523* (2013.01); *H02M 3/335* (2013.01); *H02M 2001/0003* (2013.01)

(58) Field of Classification Search
CPC ..................................................... H02M 3/335
USPC ................. 323/282, 283, 284, 285, 288, 222;
363/15, 16, 17, 21, 21.12, 21.01,
363/21.09, 41, 95, 97, 131, 21.16, 21.18
See application file for complete search history.

(56) References Cited

U.S. PATENT DOCUMENTS 3,912,340 A    10/1975    Bertolasi
5,247,241 A    9/1993    Ueda
(Continued)

FOREIGN PATENT DOCUMENTS

CN    1841893 A    10/2006
CN    1917322 A    2/2007
(Continued)

OTHER PUBLICATIONS

United States Patent and Trademark Office, Notice of Allowance mailed Nov. 9, 2012, in parent U.S. Appl. No. 12/581,775.
(Continued)

*Primary Examiner* — Matthew Nguyen
*Assistant Examiner* — Trinh Dang
(74) *Attorney, Agent, or Firm* — Jones Day

(57) ABSTRACT

System and method for adjusting a threshold of a power conversion system. The system includes a threshold generator configured to receive a first signal and generate a threshold signal based on at least information associated with the first signal, a comparator configured to receive the threshold signal and a second signal and generate a comparison signal, and a gate driver configured to generate a drive signal based on at least information associated with the comparison signal. The gate driver is coupled to at least a switch configured to receive the drive signal and affect a current flowing through a primary winding coupled to a secondary winding. If the second signal is larger than the threshold signal in magnitude, the drive signal causes the switch to open. The drive signal is associated with a switching frequency.

31 Claims, 17 Drawing Sheets

(56) References Cited

U.S. PATENT DOCUMENTS

| | | | |
|---|---|---|---|
| 5,497,119 A | 3/1996 | Tedrow et al. | |
| 5,568,044 A | 10/1996 | Bittner | |
| 5,729,448 A | 3/1998 | Haynie et al. | |
| 6,134,060 A | 10/2000 | Ryat | |
| 6,292,376 B1 * | 9/2001 | Kato | 363/21.09 |
| 6,366,070 B1 | 4/2002 | Cooke et al. | |
| 6,381,151 B1 | 4/2002 | Jang | |
| 6,545,513 B2 | 4/2003 | Tsuchida et al. | |
| 6,556,478 B2 | 4/2003 | Willis et al. | |
| 6,713,995 B2 | 3/2004 | Chen | |
| 6,798,086 B2 | 9/2004 | Utsunomiya | |
| 6,947,298 B2 | 9/2005 | Uchida | |
| 6,954,056 B2 | 10/2005 | Hoshino et al. | |
| 6,972,528 B2 | 12/2005 | Shao | |
| 6,972,548 B2 | 12/2005 | Tzeng et al. | |
| 6,977,824 B1 | 12/2005 | Yang et al. | |
| 7,035,119 B2 | 4/2006 | Koike | |
| 7,054,169 B2 | 5/2006 | Huh et al. | |
| 7,116,089 B1 | 10/2006 | Nguyen et al. | |
| 7,173,404 B2 | 2/2007 | Wu | |
| 7,208,927 B1 | 4/2007 | Nguyen | |
| 7,262,587 B2 | 8/2007 | Takimoto et al. | |
| 7,265,999 B2 | 9/2007 | Murata et al. | |
| 7,345,895 B2 | 3/2008 | Zhu et al. | |
| 7,394,634 B2 | 7/2008 | Fang et al. | |
| 7,414,865 B2 | 8/2008 | Yang | |
| 7,456,623 B2 | 11/2008 | Hasegawa et al. | |
| 7,492,619 B2 | 2/2009 | Ye et al. | |
| 7,522,431 B2 | 4/2009 | Huynh et al. | |
| 7,605,576 B2 | 10/2009 | Kanakubo | |
| 7,609,039 B2 | 10/2009 | Hasegawa | |
| 7,684,220 B2 | 3/2010 | Fang et al. | |
| 7,684,462 B2 | 3/2010 | Ye et al. | |
| 7,826,237 B2 | 11/2010 | Zhang et al. | |
| 7,852,055 B2 | 12/2010 | Michishita | |
| 7,898,825 B2 | 3/2011 | Mulligan et al. | |
| 7,990,202 B2 | 8/2011 | Fang et al. | |
| 8,085,027 B2 | 12/2011 | Lin et al. | |
| 8,213,203 B2 | 7/2012 | Fei et al. | |
| 8,305,776 B2 | 11/2012 | Fang | |
| 8,331,112 B2 | 12/2012 | Huang et al. | |
| 8,339,814 B2 | 12/2012 | Zhang et al. | |
| 8,391,028 B2 | 3/2013 | Yeh | |
| 8,488,342 B2 | 7/2013 | Zhang et al. | |
| 8,526,203 B2 | 9/2013 | Huang et al. | |
| 8,879,289 B2 | 11/2014 | Lin et al. | |
| 8,891,256 B2 | 11/2014 | Fang et al. | |
| 8,971,062 B2 | 3/2015 | Huang et al. | |
| 8,982,585 B2 | 3/2015 | Fang | |
| 2002/0080625 A1 | 6/2002 | Goyhenetche et al. | |
| 2002/0080631 A1 | 6/2002 | Kanouda et al. | |
| 2003/0174520 A1 | 9/2003 | Bimbaud | |
| 2004/0075600 A1 | 4/2004 | Vera et al. | |
| 2005/0057238 A1 * | 3/2005 | Yoshida | 323/282 |
| 2005/0116697 A1 | 6/2005 | Matsuo et al. | |
| 2005/0222646 A1 | 10/2005 | Kroll et al. | |
| 2005/0270807 A1 | 12/2005 | Strijker | |
| 2006/0034102 A1 | 2/2006 | Yang et al. | |
| 2006/0043953 A1 * | 3/2006 | Xu | 323/282 |
| 2006/0050539 A1 | 3/2006 | Yang et al. | |
| 2006/0055433 A1 | 3/2006 | Yang et al. | |
| 2006/0273772 A1 | 12/2006 | Groom | |
| 2007/0115696 A1 | 5/2007 | Berghegger | |
| 2007/0171687 A1 | 7/2007 | Kogel et al. | |
| 2007/0241733 A1 | 10/2007 | Chen et al. | |
| 2007/0273345 A1 | 11/2007 | Chen et al. | |
| 2008/0061754 A1 | 3/2008 | Hibi | |
| 2008/0112193 A1 | 5/2008 | Yan et al. | |
| 2008/0157742 A1 | 7/2008 | Martin et al. | |
| 2008/0159378 A1 | 7/2008 | Kris | |
| 2008/0225563 A1 | 9/2008 | Seo | |
| 2008/0252345 A1 | 10/2008 | Deschamp et al. | |
| 2009/0051336 A1 | 2/2009 | Hartlieb et al. | |
| 2009/0058387 A1 | 3/2009 | Huynh et al. | |
| 2009/0073727 A1 | 3/2009 | Huynh et al. | |
| 2009/0121697 A1 | 5/2009 | Aiura et al. | |
| 2009/0141520 A1 | 6/2009 | Grande et al. | |
| 2009/0175057 A1 | 7/2009 | Grande et al. | |
| 2009/0206814 A1 | 8/2009 | Zhang et al. | |
| 2009/0302817 A1 * | 12/2009 | Nagai | 323/282 |
| 2010/0061126 A1 * | 3/2010 | Huynh et al. | 363/21.12 |
| 2010/0128501 A1 | 5/2010 | Huang et al. | |
| 2010/0141178 A1 | 6/2010 | Negrete et al. | |
| 2010/0219802 A1 | 9/2010 | Lin et al. | |
| 2010/0225293 A1 * | 9/2010 | Wang et al. | 323/290 |
| 2011/0044076 A1 | 2/2011 | Zhang et al. | |
| 2011/0149614 A1 | 6/2011 | Stracquadaini | |
| 2011/0182089 A1 | 7/2011 | genannt Berghegger | |
| 2011/0248770 A1 | 10/2011 | Fang et al. | |
| 2011/0267853 A1 | 11/2011 | Yang et al. | |
| 2012/0013321 A1 | 1/2012 | Huang et al. | |
| 2012/0075891 A1 | 3/2012 | Zhang et al. | |
| 2012/0139435 A1 | 6/2012 | Storm | |
| 2012/0147630 A1 | 6/2012 | Cao et al. | |
| 2012/0153919 A1 | 6/2012 | Garbossa et al. | |
| 2012/0224397 A1 | 9/2012 | Yeh | |
| 2012/0257423 A1 | 10/2012 | Fang | |
| 2012/0281438 A1 | 11/2012 | Fang et al. | |
| 2012/0300508 A1 | 11/2012 | Fang | |
| 2013/0027989 A1 | 1/2013 | Fang | |
| 2013/0033905 A1 | 2/2013 | Lin et al. | |
| 2013/0051090 A1 | 2/2013 | Xie et al. | |
| 2013/0182476 A1 | 7/2013 | Yang et al. | |
| 2013/0223107 A1 | 8/2013 | Zhang et al. | |
| 2013/0272033 A1 | 10/2013 | Zhang et al. | |
| 2013/0308350 A1 | 11/2013 | Huang et al. | |
| 2014/0078790 A1 | 3/2014 | Lin et al. | |
| 2014/0160809 A1 | 6/2014 | Lin et al. | |
| 2014/0268920 A1 | 9/2014 | Fang et al. | |
| 2015/0055378 A1 | 2/2015 | Lin et al. | |
| 2015/0162820 A1 | 6/2015 | Zhang et al. | |
| 2015/0295499 A1 | 10/2015 | Zhang et al. | |

FOREIGN PATENT DOCUMENTS

| | | |
|---|---|---|
| CN | 1929274 A | 3/2007 |
| CN | 1964172 A | 5/2007 |
| CN | 1988347 A | 6/2007 |
| CN | 101034851 A | 9/2007 |
| CN | 101039077 A | 9/2007 |
| CN | 101079576 A | 11/2007 |
| CN | 101127495 A | 2/2008 |
| CN | 101247083 A | 8/2008 |
| CN | 101295872 A | 10/2008 |
| CN | 101350562 A | 1/2009 |
| CN | 101515756 A | 8/2009 |
| CN | 101552560 A | 10/2009 |
| CN | 101577468 A | 11/2009 |
| CN | 101577488 A | 11/2009 |
| CN | 101826796 A | 9/2010 |
| CN | 101515756 B | 11/2011 |
| CN | 102332826 A | 1/2012 |
| CN | 102474964 A | 5/2012 |
| CN | 102624237 A | 8/2012 |
| CN | 102651613 A | 8/2012 |
| CN | 102709880 A | 10/2012 |
| CN | 102723945 A | 10/2012 |
| CN | 102983760 A | 3/2013 |
| CN | 103166198 A | 6/2013 |
| CN | 103296904 A | 9/2013 |
| TW | 200840174 A | 10/2008 |
| TW | 200937157 A | 9/2009 |
| TW | I 437808 | 5/2014 |
| TW | I 448060 | 8/2014 |

OTHER PUBLICATIONS

United States Patent and Trademark Office, Office Action mailed Dec. 5, 2012, in related U.S. Appl. No. 12/859,138.

United States Patent and Trademark Office, Notice of Allowance mailed Jan. 28, 2013, in related U.S. Appl. No. 13/071,384.

United States Patent and Trademark Office, Notice of Allowance mailed Mar. 25, 2013, in related U.S. Appl. No. 13/071,384.

(56) References Cited

OTHER PUBLICATIONS

Chinese Patent Office, Office Action mailed Jun. 4, 2014, in Application No. 201110144768.2.
Taiwan Patent Office, Office Action mailed Mar. 3, 2014, in Application No. 100127088.
United States Patent and Trademark Office, Notice of Allowance mailed Jul. 30, 2014, in U.S. Appl. No. 12/859,138.
United States Patent and Trademark Office, Notice of Allowance mailed Jul. 7, 2014, in U.S. Appl. No. 13/164,608.
United States Patent and Trademark Office, Notice of Allowance mailed Jun. 25, 2014, in U.S. Appl. No. 13/215,028.
United States Patent and Trademark Office, Notice of Allowance mailed Mar. 18, 2014, in U.S. Appl. No. 13/215,028.
United States Patent and Trademark Office, Notice of Allowance mailed Mar. 7, 2014, in U.S. Appl. No. 13/164,608.
United States Patent and Trademark Office, Office Action mailed Apr. 1, 2014, in U.S. Appl. No. 13/646,239.
United States Patent and Trademark Office, Notice of Allowance mailed Nov. 25, 2013, in U.S. Appl. No. 13/164,608.
United States Patent and Trademark Office, Office Action mailed Jul. 31, 2013, in U.S. Appl. No. 12/859,138.
United States Patent and Trademark Office, Notice of Allowance mailed Jan. 16, 2014, in U.S. Appl. No. 13/215,028.
United States Patent and Trademark Office, Office Action mailed Aug. 27, 2013, in U.S. Appl. No. 13/646,239.
Chinese Patent Office, Office Action mailed Nov. 14, 2013, in Application No. 201110224933.5.
Chinese Patent Office, Office Action mailed Nov. 12, 2013, in Application No. 201110051423.2.
Chinese Patent Office, Office Action mailed Nov. 7, 2013, in Application No. 201210342097.5.
Chinese Patent Office, Office Action mailed Nov. 5, 2013, in Application No. 201210529679.4.
Chinese Patent Office, Office Action mailed Nov. 5, 2013, in Application No. 201310078547.9.
Chinese Patent Office, Office Action mailed Dec. 8, 2014, in Application No. 201110034669.9.
Taiwan Patent Office, Office Action mailed May 6, 2015, in Application No. 102116550.
Taiwan Patent Office, Office Action mailed Oct. 6, 2014, in Application No. 102115002.
Taiwan Patent Office, Office Action mailed Oct. 1, 2014, in Application No. 102116551.
United States Patent and Trademark Office, Notice of Allowance mailed Jan. 20, 2015, in U.S. Appl. No. 12/859,138.
United States Patent and Trademark Office, Notice of Allowance mailed Aug. 7, 2015, in U.S. Appl. No. 14/151,209.
United States Patent and Trademark Office, Office Action mailed Feb. 24, 2015, in U.S. Appl. No. 13/722,788.
United States Patent and Trademark Office, Office Action mailed Mar. 12, 2015, in U.S. Appl. No. 13/857,836.
United States Patent and Trademark Office, Office Action mailed Mar. 12, 2015, in U.S. Appl. No. 13/915,477.
Chinese Patent Office, Office Action mailed Nov. 25, 2015, in Application No. 201310656906.4.
Chinese Patent Office, Office Action mailed Dec. 4, 2015, in Application No. 201410226277.6.
Taiwan Patent Office, Office Action mailed Oct. 16, 2015, in Application No. 102116550.
United States Patent and Trademark Office, Notice of Allowance mailed Nov. 16, 2015, in U.S. Appl. No. 14/151,209.
United States Patent and Trademark Office, Notice of Allowance mailed Oct. 2, 2015, in U.S. Appl. No. 13/722,788.
United States Patent and Trademark Office, Notice of Allowance mailed Oct. 5, 2015, in U.S. Appl. No. 13/915,477.
United States Patent and Trademark Office, Notice of Allowance mailed Sep. 30, 2015, in U.S. Appl. No. 13/857,836.
United States Patent and Trademark Office, Office Action mailed Aug. 20, 2015, in U.S. Appl. No. 13/646,268.
United States Patent and Trademark Office, Notice of Allowance mailed Feb. 1, 2016, in U.S. Appl. No. 13/722,788.
United States Patent and Trademark Office, Notice of Allowance mailed Feb. 10, 2016, in U.S. Appl. No. 13/857,836.
United States Patent and Trademark Office, Notice of Allowance mailed Feb. 22, 2016, in U.S. Appl. No. 13/915,477.
United States Patent and Trademark Office, Office Action mailed Mar. 7, 2016, in U.S. Appl. No. 14/293,280.
United States Patent and Trademark Office, Notice of Allowance mailed Apr. 21, 2016, in U.S. Appl. No. 14/684,047.
United States Patent and Trademark Office, Office Action mailed Apr. 20, 2016, in U.S. Appl. No. 14/488,176.

\* cited by examiner

SYSTEMS AND METHODS FOR DYNAMIC THRESHOLD ADJUSTMENT WITH PRIMARY-SIDE SENSING AND REGULATION FOR FLYBACK POWER CONVERTERS

1. CROSS-REFERENCES TO RELATED APPLICATIONS

This application claims priority to Chinese Patent Application No. 201110034669.9, filed Feb. 1, 2011, commonly assigned, incorporated by reference herein for all purposes.

Additionally, this application is related to U.S. patent application Ser. No. 12/859,138, commonly assigned, incorporated by reference herein for all purposes.

2. BACKGROUND OF THE INVENTION

The present invention is directed to integrated circuits. More particularly, the invention provides dynamic threshold adjustment for over-current protection. Merely by way of example, the invention has been applied to a flyback power converter. But it would be recognized that the invention has a much broader range of applicability.

Generally, a conventional power conversion system often uses a transformer to isolate the input voltage on the primary side and the output voltage on the secondary side. To regulate the output voltage, certain components, such as TL431 and an opto-coupler, can be used to transmit a feedback signal from the secondary side to a controller chip on the primary side. Alternatively, the output voltage on the secondary side can be imaged to the primary side, so the output voltage is controlled by directly adjusting some parameters on the primary side.

FIG. 1 is a simplified diagram showing a conventional flyback power conversion system with primary-side sensing and regulation. The power conversion system 100 includes a primary winding 110, a secondary winding 112, an auxiliary winding 114, a power switch 120, a current sensing resistor 130, an equivalent resistor 140 for an output cable, resistors 150 and 152, and a rectifying diode 160. For example, the power switch 120 is a bipolar transistor. In another example, the power switch 120 is a MOS transistor.

To regulate the output voltage within a predetermined range, information related to the output voltage and the output loading often needs to be extracted. In the discontinuous conduction mode (DCM), such information can be extracted through the auxiliary winding 114. When the power switch 120 is turned on, the energy is stored in the secondary winding 112. Then, when the power switch 120 is turned off, the stored energy is released to the output terminal, and the voltage of the auxiliary winding 114 maps the output voltage on the secondary side as shown below.

$$V_{FB} = \frac{R_2}{R_1+R_2} \times V_{aux} = k \times n \times (V_o + V_F + I_o \times R_{eq}) \quad \text{(Equation 1)}$$

where $V_{FB}$ represents a voltage at a node 154, and $V_{aux}$ represents the voltage of the auxiliary winding 114. $R_1$ and $R_2$ represent the resistance values of the resistors 150 and 152 respectively. Additionally, n represents a turns ratio between the auxiliary winding 114 and the secondary winding 112. Specifically, n is equal to the number of turns of the auxiliary winding 114 divided by the number of turns of the secondary winding 112. $V_o$ and $I_o$ represent the output voltage and the output current respectively. Moreover, $V_F$ represents the forward voltage of the rectifying diode 160, and $R_{eq}$ represents the resistance value of the equivalent resistor 140. Also, k represents a feedback coefficient as shown below:

$$k = \frac{R_2}{R_1+R_2} \quad \text{(Equation 2)}$$

FIG. 2 is a simplified diagram showing a conventional operation mechanism for the flyback power conversion system 100. As shown in FIG. 2, the controller chip of the conversion system 100 uses a sample-and-hold mechanism. When the demagnetization process on the secondary side is almost completed and the current $I_{sec}$ of the secondary winding 112 almost becomes zero, the voltage $V_{aux}$ of the auxiliary winding 112 is sampled at, for example, point A of FIG. 2. The sampled voltage value is usually held until the next voltage sampling is performed. Through a negative feedback loop, the sampled voltage value can become equal to a reference voltage $V_{ref}$. Therefore, $$V_{FB} = V_{ref} \quad \text{(Equation 3)}$$

Combining Equations 1 and 3, the following can be obtained:

$$V_o = \frac{V_{ref}}{k \times n} - V_F - I_o \times R_{eq} \quad \text{(Equation 4)}$$

Based on Equation 4, the output voltage decreases with the increasing output current.

The primary-side sensing and regulation can be used for both pulse-width modulation (PWM) and the pulse-frequency modulation (PFM). FIGS. 3 and 4 are each a simplified diagram showing a conventional flyback power conversion system with primary-side sensing and regulation for constant output voltage under pulse-frequency modulation. As shown, the power conversion system 300 includes an exponential generator 310, a switch 320, a primary winding 340, a secondary winding 342, a capacitor 352, an error amplifier 360, a comparator 370, a demagnetization detector 380, an oscillator 390, and terminals 330, 332, and 334. Additionally, the power conversion system 300 also includes a resistor 322, a flip-flop component 374, a gate driver 384, and a comparator 386.

Similarly, the power conversion system 400 includes an exponential generator 410, a switch 420, a primary winding 440, a secondary winding 442, a capacitor 452, an error amplifier 460, a comparator 470, a demagnetization detector 480, an oscillator 490, and terminals 430, 432, and 434. Additionally, the power conversion system 400 also includes a resistor 422, a flip-flop component 474, a gate driver 484, and a comparator 486.

For example, the exponential generator 310 or 410 includes a switch-capacitor circuit controlled by an oscillation period T of an oscillator with a predetermined constant oscillation frequency. In another example, the switch 320 is a bipolar transistor, and the switch 420 is a MOS transistor.

As shown in FIG. 3 or 4, the demagnetization detector 380 or 480 outputs a signal 382 or 482 to the exponential generator 310 or 410 respectively. Additionally, the oscillator 390 or 490 also outputs a signal 392 or 492 to the exponential generator 310 or 410 respectively. Additionally, the switch 320 or 420 is controlled by a signal 396 or 496 through the terminal 334 or 434. Moreover, a signal 398 or 498 for sensing a current that flows through the primary winding 340 or 440 is generated by the resistor 322 or 422 respectively, and is received by the terminal 330 or 430 respectively.

FIG. 5 is a simplified diagram showing the conventional exponential generator 310 or 410 for the conventional power conversion system 300 or 400. The conventional exponential generator 500 can be used as the exponential generator 310 or the exponential generator 410. As shown, the exponential generator 500 includes switches 510, 520, and 540, capacitors 514 and 524, a counter 550, a frequency divider 560, a switch controller 570, and a NOT gate 580.

The switch 510 is controlled by a signal 512, the switch 520 is controlled by a signal 522, and the switch 540 is controlled by a signal 542. For example, the signal 542 is the signal 382 or 482. The signals 512 and 522 are generated based on at least a clock signal 532 outputted from an oscillator. For example, the clock signal 532 is the signal 392 or 492 generated by the oscillator 390 or 490 respectively.

Specifically, when the switch 510 is closed and the switches 520 and 540 are open, a reference voltage $V_{refb}$ charges the capacitor 514. In contrast, when the switch 520 is closed and the switches 510 and 540 are open, some charges are transferred from the capacitor 514 to the capacitor 524, causing the voltage on the capacitor 524 to rise. As the voltage on the capacitor 524 becomes higher and higher, the amount of additional charges transferred from the capacitor 514 to the capacitor 524 becomes less and less when, every time, the switch 510 is made open and the switch 520 is made closed, with the switch 540 remaining open.

Hence, if the switch 540 remains open, the voltage on the capacitor 524 rises approximately exponentially with the switch 510 alternating between being open and closed and the switch 520 alternating between being closed and open. When the switch 540 is closed by the signal 542, the capacitor 524 is discharged by a reference voltage $V_{refa}$. Afterwards, the signal 542 changes the switch 540 from being closed to being open.

As shown in FIG. 5, the counter 550 also receives the signal 542 as well as a signal 552 from the frequency divider 560. The signal 552 represents rising edges of the clock signal 532 that is received by the frequency divider 560. The clock period of the clock signal 532 is denoted as T. When the signal 542 changes the switch 540 from being closed to being open, the counter 550 is also reset. Based on the signal 552, the counter 550 generates output signals 554. The output signals 554 include output signals clk2, clk4, . . . , clkm, . . . , and clkN, wherein 2≤m≤N·m and N are each equal to a power of 2 (e.g., 2 to the power of an integer). When the clkm signal rises from a logic low level to a logic high level (e.g., from the "0" level to the "1" level) for the first time since the reset, the time period since the last reset is $$n \times T = \frac{m \times T}{2}.$$

n represents the time period since the last reset in terms of the number of the clock periods.

Additionally, the counter 550 also sends an output signal 556 to a switch controller 570. Based on the output signal 556, the switch controller 570 closes only one of the switches that correspond to "clk", "½ clk", "¼ clk", and "⅛ clk" respectively. Specifically, if 0≤n≤64, the switch corresponding to "clk" is closed, and the switching period for the switches 510 and 520 is equal to T. If 64<n≤128, the switch corresponding to "½ clk" is closed, and the switching period for the switches 510 and 520 is equal to 2 T. If 128<n≤512, the switch corresponding to "¼ clk" is closed, and the switching period for the switches 510 and 520 is equal to 4 T. If n>512, the switch corresponding to "⅛ clk" is closed, and the switching period for the switches 510 and 520 is equal to 8 T. Hence, $$V_{ramp}(n) = (V_{refb} - V_{refa}) \times (1 - e^{-(\frac{n \times T}{\tau})}) + V_{refa} \quad \text{(Equation 5)}$$

where $V_{ramp}$ represents the voltage magnitude of a signal 526. For example, the signal 526 is the signal 312 or 412. Additionally, $V_{refa}$ and $V_{refb}$ each represent a constant voltage level. For example, $V_{refa}$ equals 1V, and $V_{refb}$ equals 3V. Moreover, n represents the time for the signal 526 to rise since the last reset of the counter 550 in terms of the number of the clock periods. T is the clock period of the clock signal 532. Furthermore, τ is the time constant. Specifically, if 0≤n≤64, Σ=128×T; if 64<n≤128, τ=256×T; if 128<n≤256, τ=512×T; and if 256<n, τ=1024×T.

Returning to FIG. 3 or 4, when the switch 320 or 420 is turned on, the transformer stores energy. The current flowing through the primary winding 340 or 440 ramps up linearly, and the signal 398 or 498 (e.g., a current-sensing voltage) also ramps up linearly. The signal 398 or 498 is received by the comparator 386 or 486 respectively, and is compared with a threshold signal 399 or 499 for over-current protection (OCP) respectively. For example, the threshold signal 399 or 499 is a threshold voltage that is equal to 0.5 V. In response, the comparator 386 or 486 outputs a comparison signal 388 or 499 to the flip-flop component 374. For example, if the signal 398 exceeds the threshold signal 399 in magnitude, the comparison signal 388 is at the logic high level. In another example, if the signal 498 exceeds the threshold signal 499 in magnitude, the comparison signal 488 is at the logic high level.

When the switch 320 or 420 is turned off, the energy stored in the transformer is released to the output terminal. The demagnetization process starts, and the current flowing through the secondary winding 342 or 442 ramps down linearly. When the demagnetization process almost ends and the current flowing through the secondary winding 342 or 442 approaches zero, a sampling signal 350 or 450 is generated to sample the feedback voltage at the terminal 332 or 432. The sampled voltage is held on the capacitor 352 or 452. Additionally, the sampled/held voltage is compared with a reference voltage $V_{ref}$ such as 2V, and the difference between the sampled/held voltage and the reference voltage $V_{ref}$ is amplified by the error amplifier 360 or 460 to generate an amplified signal 362 or 462. The amplified signal 362 or 462 is received by the negative input terminal of the comparator 370 or 470, whose output signal 372 or 472 is received by the flip-flop component 374 or 474 and used to generate the signal 396 or 496 respectively.

The flip-flop component 374 receives the signals 372 and 388, and in response generates a signal 376. If the signal 372 is at the logic high level and the signal 388 is at the logic low level, the signal 376 is at the logic high level. In contrast, if the signal 372 is at the logic high level and the signal 388 is also at the logic high level, the signal 376 is at the logic low level. Similarly, the flip-flop component 474 receives the signals 472 and 488, and in response generates a signal 476. If the signal 472 is at the logic high level and the signal 488 is at the logic low level, the signal 476 is at the logic high level. In contrast, if the signal 472 is at the logic high level and the signal 488 is also at the logic high level, the signal 476 is at the logic low level.

As shown in FIG. 3, the signal 376 is received by the gate driver 384, which outputs the signal 396 to the switch 320. If the signal 376 is at the logic high level, the signal 396 is also at the logic high level and causes the switch 320 to be turned on. In contrast, if the signal 376 is at the logic low level, the signal 396 is also at the logic low level and causes the switch 320 to be turned off. Similarly, as shown in FIG. 4, the signal 476 is received by the gate driver 484, which outputs the signal 496 to the switch 420. If the signal 476 is at the logic high level, the signal 496 is also at the logic high level and causes the switch 420 to be turned on. In contrast, if the signal 476 is at the logic low level, the signal 496 is also at the logic low level and causes the switch 420 to be turned off.

Additionally, when the demagnetization process starts, a ramp signal 312 or 412 of the exponential generator 310 or 410 is restored to an initial value. For example, the ramp signal 312 or 412 is the signal 526, which is restored to $V_{refa}$ according to Equation 5 when the demagnetization process starts. After the demagnetization process is completed, the ramp signal 312 or 412 increases exponentially. If the ramp signal 312 or 412 becomes higher than the amplified signal 362 or 462 in magnitude, the comparison signal 372 or 472 is at the logic high level (e.g., at the "1" level), and the switch 320 or 420 is turned on.

Referring to FIG. 3 or 4, the larger the output load of the power conversion system 300 or 400 is, the lower the amplified signal 362 or 462 of the error amplifier 360 or 460 becomes in magnitude. Hence, the time period when the switch 320 or 420 remains turned off also becomes shorter. In contrast, the smaller the output load of the power conversion system 300 or 400 is, the higher the amplified signal 362 or 462 of the error amplifier 360 or 460 becomes in magnitude. Hence, the time period when the switch 320 or 420 remains turned off also becomes longer.

FIG. 6 is a simplified diagram showing certain conventional waveforms for the power conversion system 300 or 400. A waveform 610 represents the signal 382 or 482 as a function of time, a waveform 620 represents the signal 396 or 496 as a function of time, a waveform 630 represents the signal 398 or 498 as a function of time, a waveform 640 represents the signal 312 or 412 as a function of time, a waveform 650 represents the signal 362 or 462 as a function of time. As shown in FIG. 6, the time period $t_{off}$ when the switch 320 or 420 remains turned off is equal to $t_{Demag}+t_{ramp}$. $t_{Demag}$ represents the time period of the demagnetization process, and $t_{ramp}$ represents the time period for the signal 312 or 412 to rise to the level of the signal 362 or 462 in magnitude. For example, the signal 312 or 412 is the signal 526 generated by the exponential generator 500. The voltage magnitude $V_{ramp}$ of the signal 526 rises until the switch 540 is closed by the signal 542. In another example, $t_{ramp}$ is equal to $n_{ramp} \times T$. In yet another example, at $n=n_{ramp}$, $V_{ramp}$ is smaller than $V_{refb}$ according to Equation 5, where n represents the time for the signal 526 to rise in terms of the number of the clock periods. In yet another example, n×T is represented by the output signals 554.

But the power conversion system 300 or 400 often cannot provide effective dynamic response with load changes. Hence it is highly desirable to improve the techniques of dynamic response using primary-side sensing and regulation.

3. BRIEF SUMMARY OF THE INVENTION

The present invention is directed to integrated circuits. More particularly, the invention provides dynamic threshold adjustment for over-current protection. Merely by way of example, the invention has been applied to a flyback power converter. But it would be recognized that the invention has a much broader range of applicability.

According to one embodiment, a system for adjusting a threshold of a power conversion system includes a threshold generator configured to receive a first signal and generate a threshold signal based on at least information associated with the first signal, a comparator configured to receive the threshold signal and a second signal and generate a comparison signal, and a gate driver configured to generate a drive signal based on at least information associated with the comparison signal. The gate driver is coupled to at least a switch configured to receive the drive signal and affect a current flowing through a primary winding coupled to a secondary winding. If the second signal is larger than the threshold signal in magnitude, the drive signal causes the switch to open. The drive signal is associated with a switching frequency. The second signal increases with the increasing current in magnitude and decreases with the decreasing current in magnitude, and the threshold signal increases with the increasing switching frequency in magnitude and decreases with the decreasing switching frequency in magnitude.

According to another embodiment, a system for adjusting an effective threshold of a power conversion system includes a current generator configured to receive a first signal and generate a first current based on at least information associated with the first signal, and a first comparator configured to receive a predetermined threshold voltage and a first voltage and generate a first comparison signal. The first voltage is a sum of a second voltage and a third voltage. Additionally, the system includes a gate driver configured to generate a drive signal based on at least information associated with the comparison signal. The gate driver is coupled to at least a switch configured to receive the drive signal and affect a second current flowing through a primary winding coupled to a secondary winding. If the first voltage is larger than the predetermined threshold voltage in magnitude, the drive signal causes the switch to open. The drive signal is associated with a switching frequency. The second voltage increases with the increasing first current in magnitude and decreases with the decreasing first current in magnitude, and the third voltage increases with the increasing second current in magnitude and decreases with the decreasing second current in magnitude. The first current decreases with the increasing switching frequency in magnitude and increases with the decreasing switching frequency in magnitude.

According to yet another embodiment, a method for adjusting a threshold of a power conversion system includes receiving a first signal, processing information associated with the first signal, and generating a threshold signal based on at least information associated with the first signal. Additionally, the method includes receiving the threshold signal and a second signal, and generating a comparison signal based on at least information associated with the threshold signal and the second signal. Moreover, the method includes processing information associated with the comparison signal, and generating a drive signal based on at least information associated with the first comparison signal to affect a current flowing through a primary winding coupled to a secondary winding. If the second signal is larger than the threshold signal in magnitude, the drive signal causes the current to decrease. The drive signal is associated with a switching frequency. The second signal increases with the increasing current in magnitude and decreases with the decreasing current in magnitude, and the threshold signal increases with the increasing switching frequency in magnitude and decreases with the decreasing switching frequency in magnitude.

According to yet another embodiment, a method for adjusting an effective threshold of a power conversion system includes receiving a first signal, processing information associated with the first signal, and generating a first current based on at least information associated with the first signal. Additionally, the method includes receiving a predetermined threshold voltage and a first voltage, and generating a first comparison signal based on at least information associated with the predetermined threshold voltage and the first voltage. The first voltage is a sum of a second voltage and a third voltage. Moreover, the method includes processing information associated with the first comparison signal, and generating a drive signal based on at least information associated with the first comparison signal to affect a second current flowing through a primary winding coupled to a secondary winding. If the first voltage is larger than the predetermined threshold voltage in magnitude, the drive signal causes the second current to decrease. The drive signal is associated with a switching frequency. The second voltage increases with the increasing first current in magnitude and decreases with the decreasing first current in magnitude, and the third voltage increases with the increasing second current in magnitude and decreases with the decreasing second current in magnitude. The first current decreases with the increasing switching frequency in magnitude and increases with the decreasing switching frequency in magnitude.

Many benefits are achieved by way of the present invention over conventional techniques. Certain embodiments of the present invention dynamically adjust the on-time duration with pulse-frequency modulation. Some embodiments of the present invention raise the minimum frequency (e.g., the frequency under no load condition) and improve dynamic response to load changes, without reducing range of load changes or increasing standby power consumption.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

The present invention is directed to integrated circuits. More particularly, the invention provides dynamic threshold adjustment for over-current protection. Merely by way of example, the invention has been applied to a flyback power converter. But it would be recognized that the invention has a much broader range of applicability.

Figure 1:
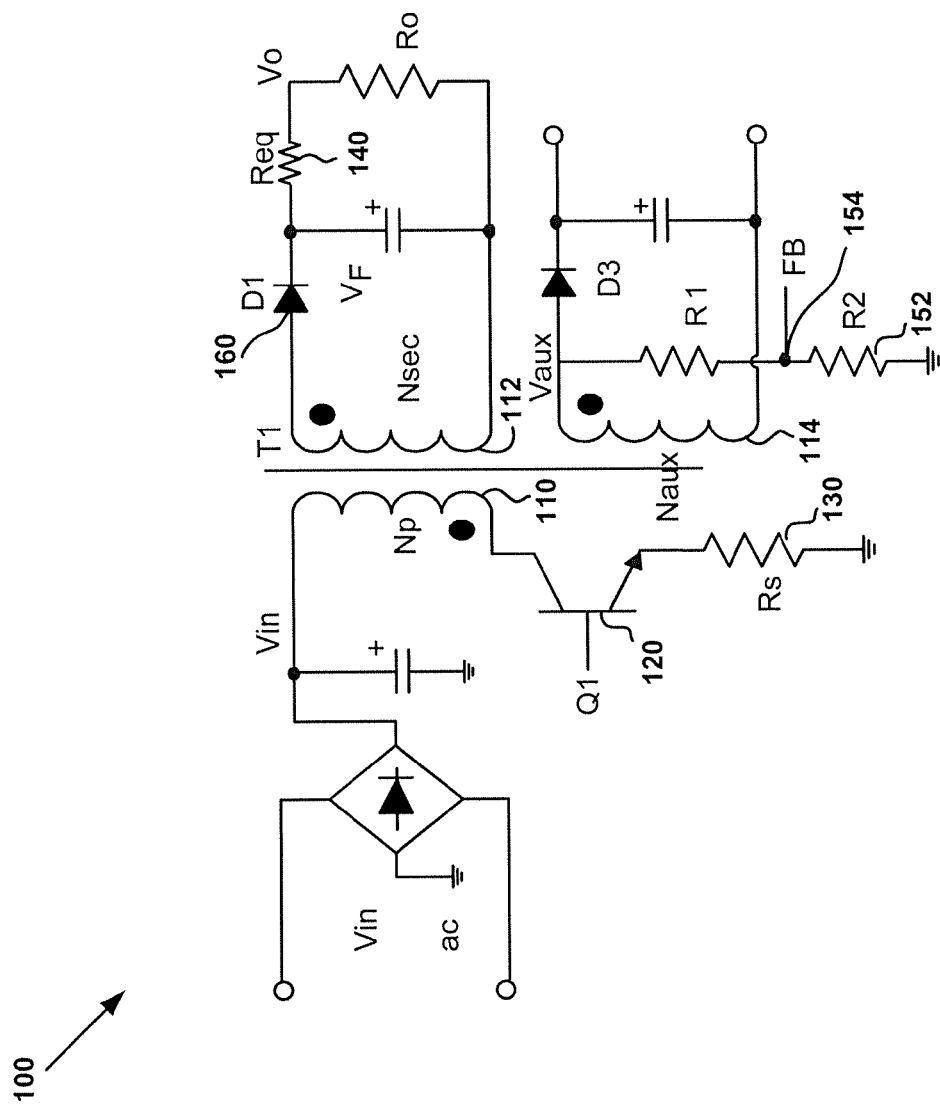
FIG. 1 is a simplified diagram showing a conventional flyback power conversion system with primary-side sensing and regulation.
Figure 2:
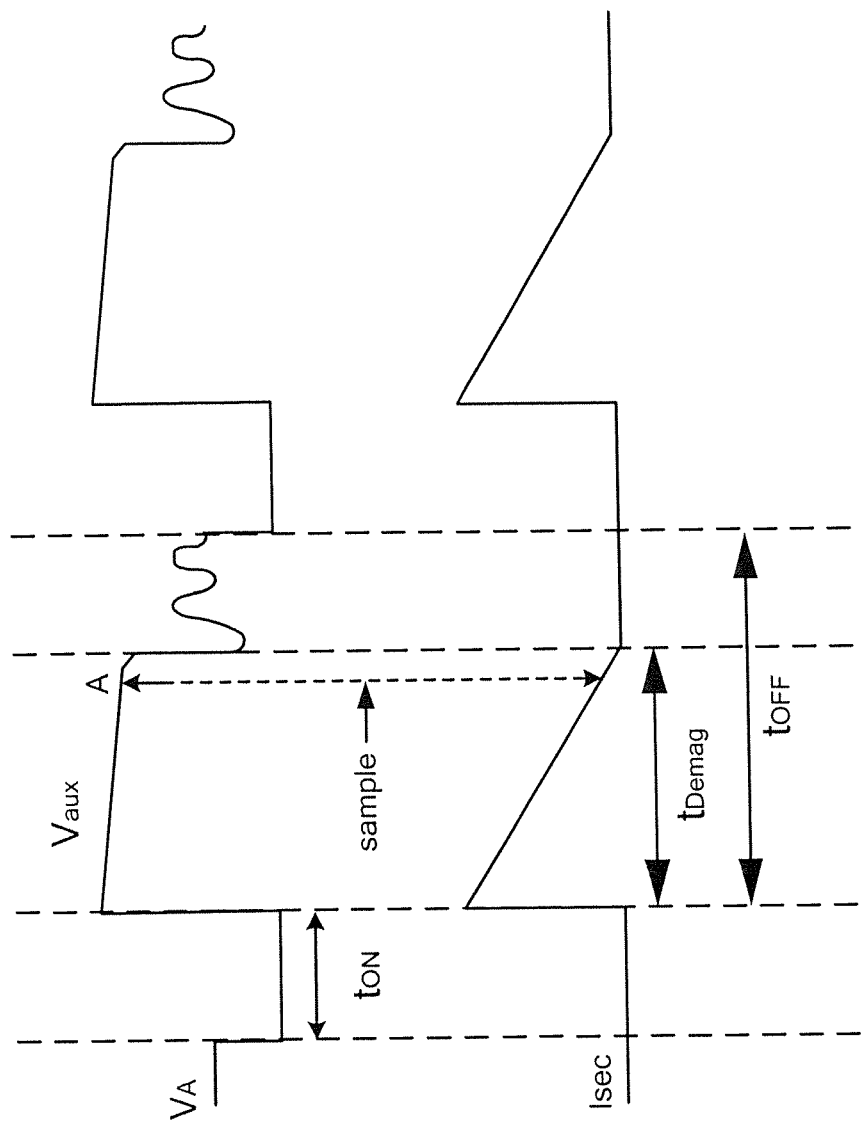
FIG. 2 is a simplified diagram showing a conventional operation mechanism for the flyback power conversion system.
Figure 3:
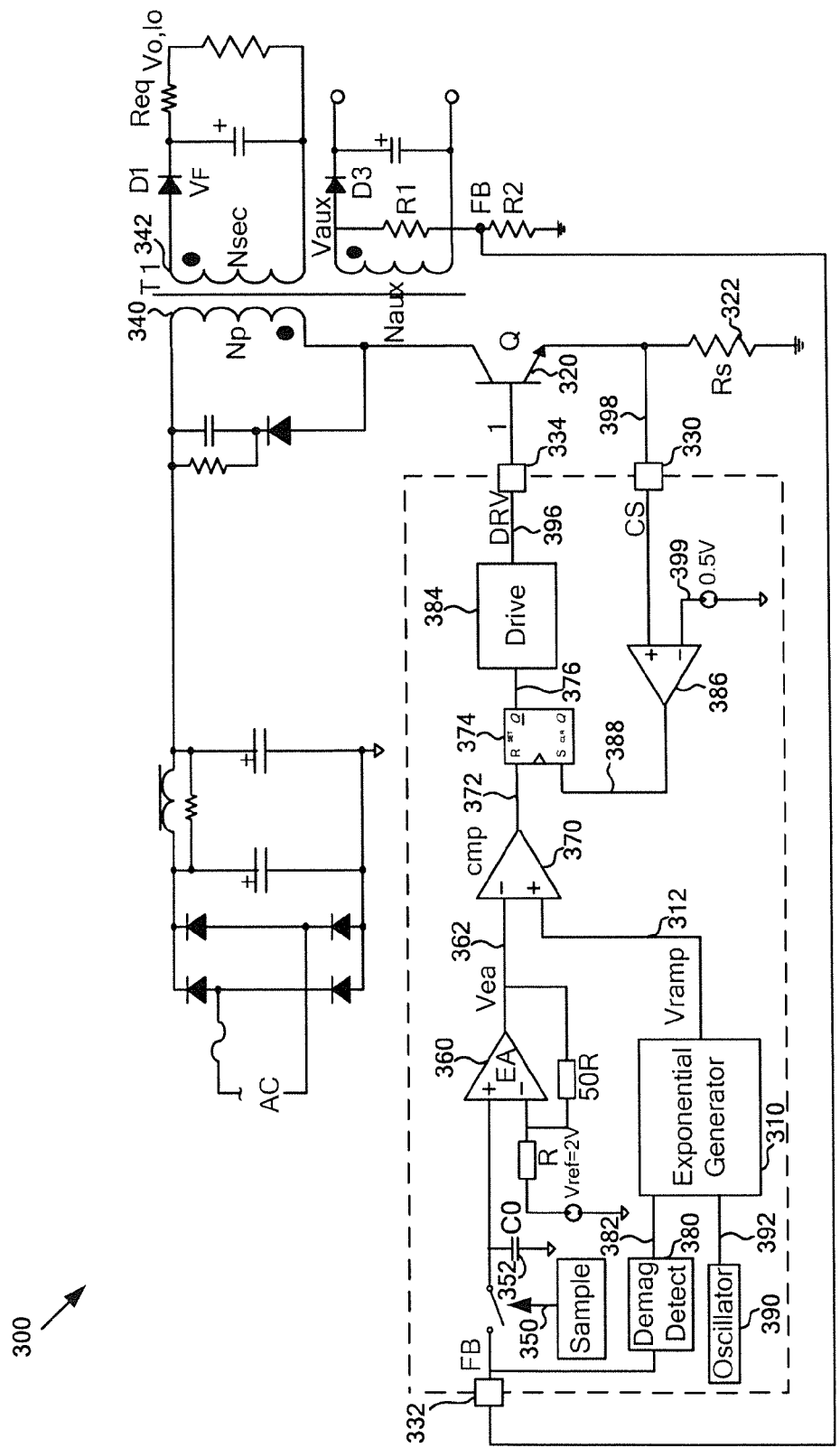
FIGS. 3 and 4 are each a simplified diagram showing a conventional flyback power conversion system with primary-side sensing and regulation for constant output voltage under pulse-frequency modulation.
Figure 4:
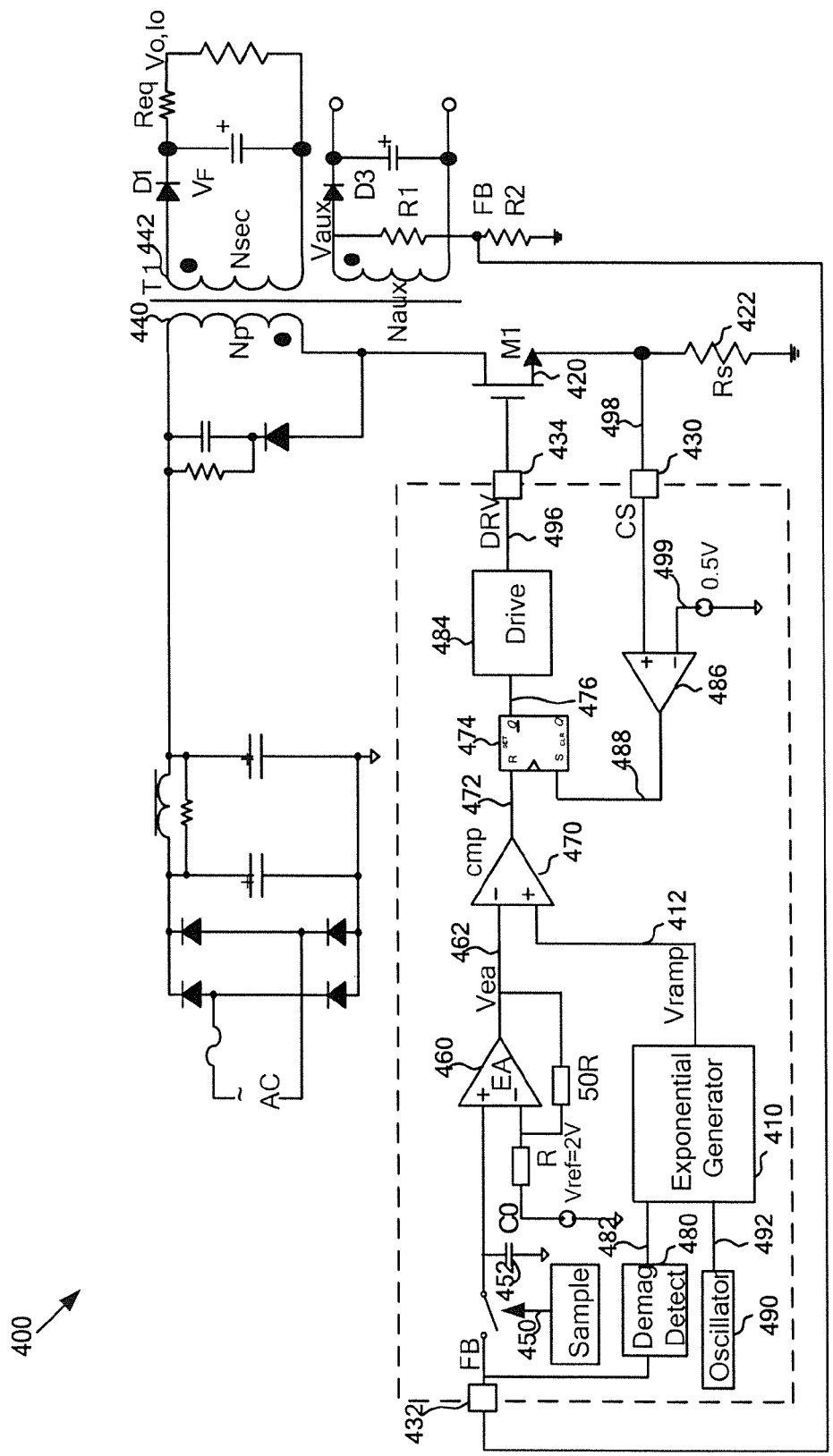
Figure 5:
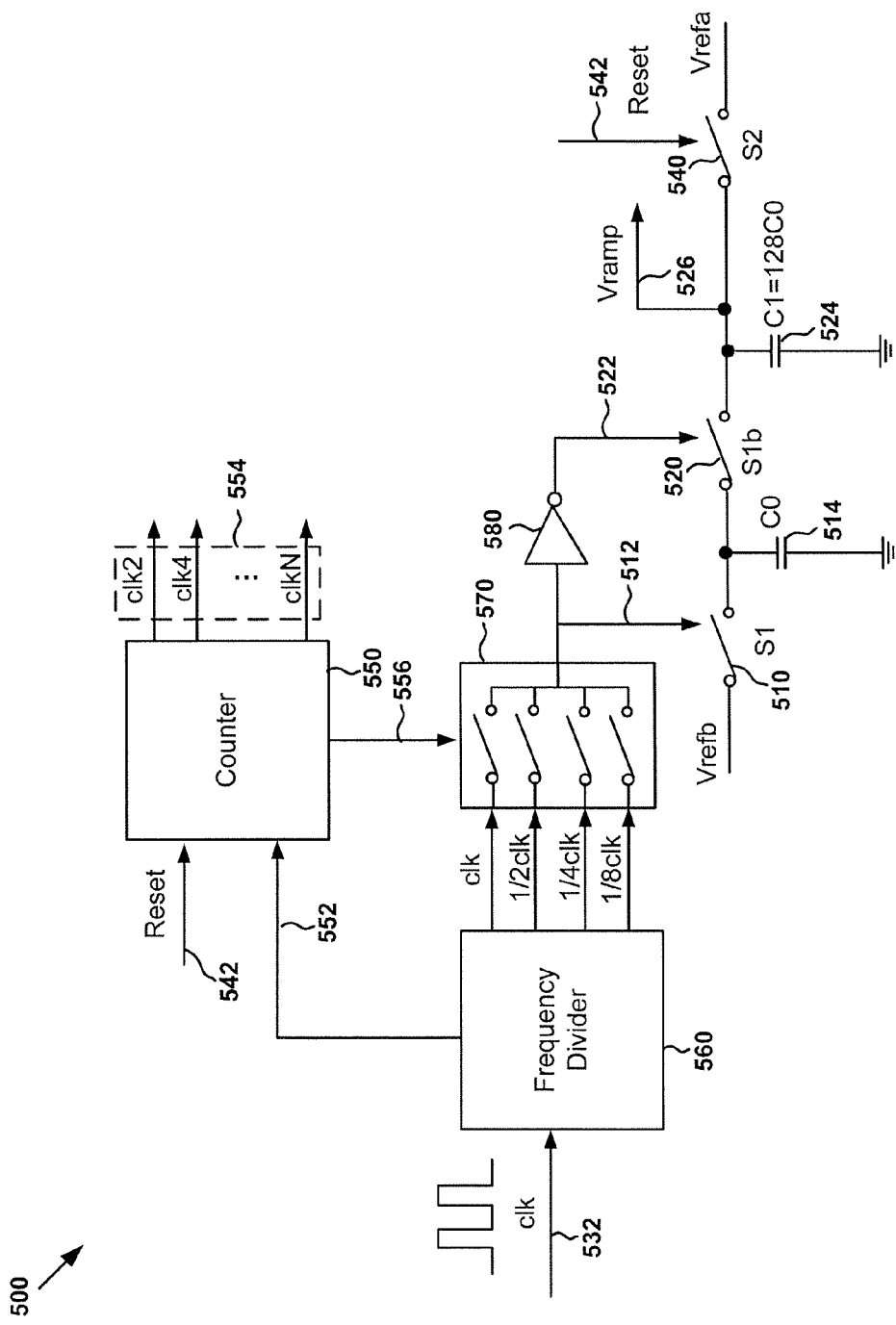
FIG. 5 is a simplified diagram showing the conventional exponential generator for the conventional power conversion system.
Figure 6:
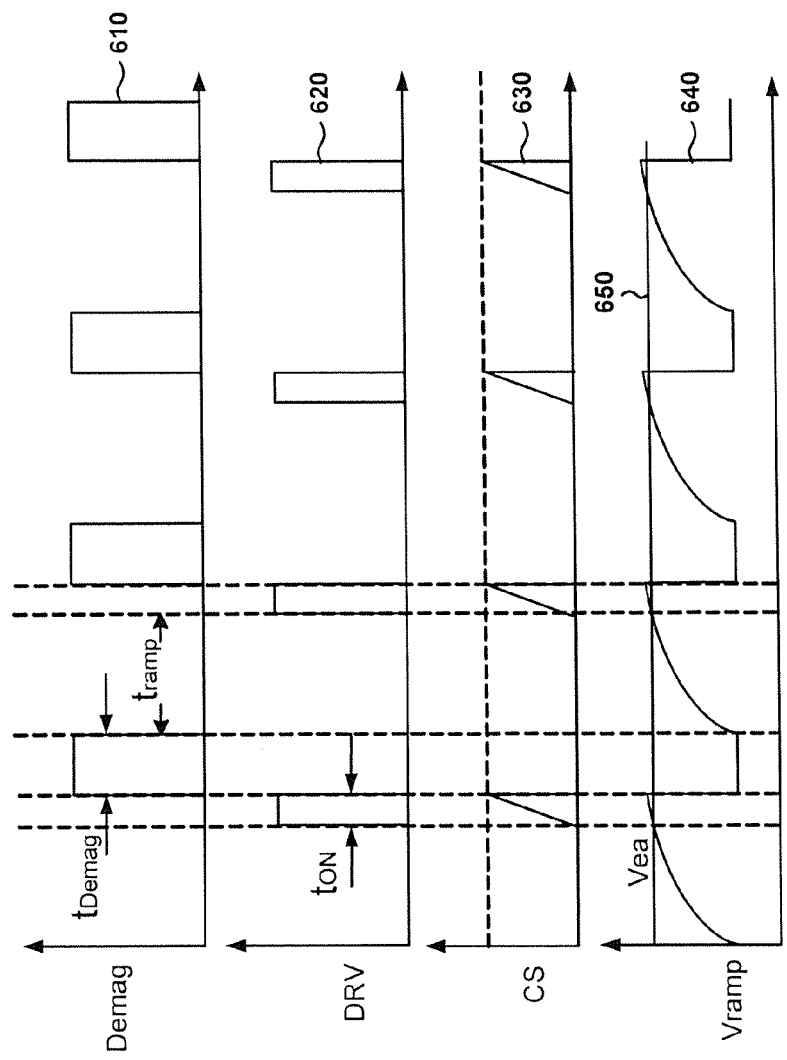
FIG. 6 is a simplified diagram showing certain conventional waveforms for the power conversion system.

Referring to FIGS. 3 and 4, in the discontinuous conduction mode (DCM), the energy transfer relationship for the flyback power conversion system 300 or 400 is $$P_o = \tfrac{1}{2} \times L \times I_p^2 \times F_s \times \eta \quad \text{(Equation 6)}$$

where $P_o$ represents the output power of the system 300 or 400. Additionally, L represents the conductance of the primary winding 340 or 440, and $I_p$ represents the peak current of the primary winding 340 or 440. Moreover, $F_s$ represents the switching frequency of the power switch 320 or 420, and η represents the conversion efficiency of the system 300 or 400. Furthermore, $$I_p = \frac{V_{thoc}}{R_s} \quad \text{(Equation 7)}$$

where $V_{thoc}$ represents the magnitude of the threshold signal 399 or 499, and $R_s$ represents the resistance value of the resistor 322 or 422. Hence, Equation 6 can become $$P_o = \frac{1}{2} \times L \times \left(\frac{V_{thoc}}{R_s}\right)^2 \times F_s \times \eta \quad \text{(Equation 8)}$$

Accordingly, if L, $V_{thoc}$, $R_s$, and $\eta$ are constants, the output power $P_o$ is proportional to the switching frequency $F_s$.

For example, if the power conversion system 300 or 400 has an output voltage of 5V and an output current of 1 A at full load and an output voltage of 5V and an output current of 5 mA at no load, the switching frequency $F_s$ is equal to 40 KHz at full load (e.g., $F_{smax}$=40 KHz) and is equal to 0.2 KHz at no load (e.g., $F_{smin}$=0.2 KHz), with an output capacitance $C_o$ of 680 μF. According to one embodiment, based on Equation 8, $$P_{max}/P_{min}=F_{smax}/F_{smin}=200 \quad \text{(Equation 9a)}$$

where $P_{max}$ represents the output power at $F_{smax}$=40 KHz and $P_{min}$ represents the output power at $F_{smin}$=0.2 KHz. Referring to FIG. 3 or 4, when the demagnetization process on the secondary side is almost completed and the current $I_{sec}$ of the secondary winding 342 or 442 almost becomes zero, the voltage $V_{aux}$ of the auxiliary winding is sampled by controller chip. Hence, if the load condition changes from no load to full load, the controller chip has to wait until the next demagnetization process in order to detect the changes in output voltage. Consequently, even if the system 300 or 400 raises the switching frequency immediately after detecting any drop in output voltage, the output voltage may have already dropped by $$\Delta V_o = \frac{I_o \times t}{C_o} \cong \frac{1A \times 1/0.2 \text{ KHz}}{680 \ \mu F} = 0.74V \quad \text{(Equation 9b)}$$

Therefore, to improve the dynamic response of the power conversion system 300 or 400, the minimum switching frequency (e.g., the switching frequency at no load) should be raised. But, a higher minimum switching frequency can narrows the range of load changes. In order to support a wide range of load changes, a dummy load is used, but the dummy load also increases the standby power consumption of the system 300 or 400.

Figure 7:
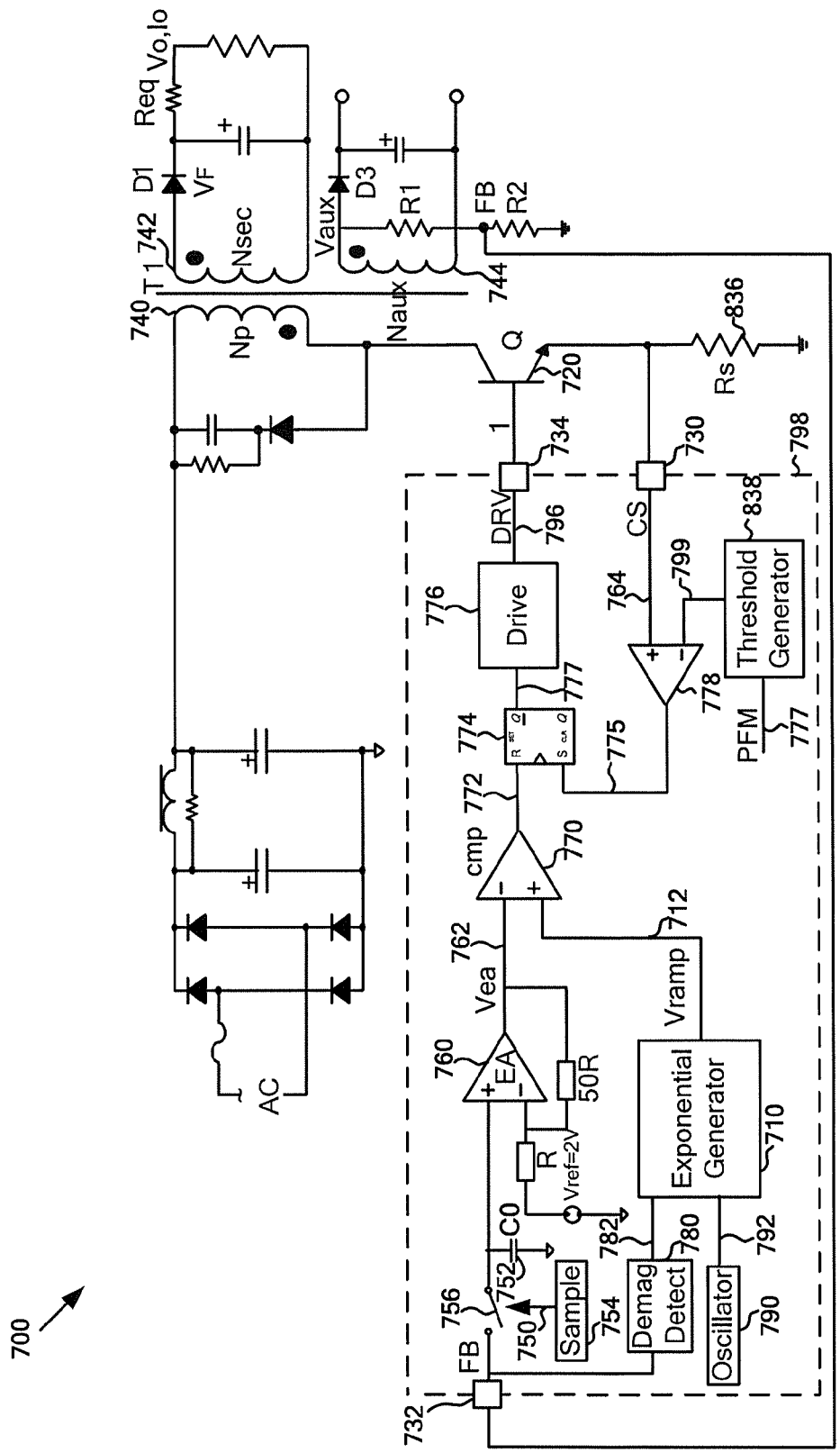
FIG. 7 is a simplified diagram showing a flyback power conversion system with dynamic threshold adjustment according to an embodiment of the present invention.

FIG. 7 is a simplified diagram showing a flyback power conversion system with dynamic threshold adjustment according to an embodiment of the present invention. This diagram is merely an example, which should not unduly limit the scope of the claims. One of ordinary skill in the art would recognize many variations, alternatives, and modifications.

The power conversion system 700 includes an exponential generator 710, a switch 720, a primary winding 740, a secondary winding 742, an auxiliary winding 744, a capacitor 752, a sampling controller 754, a sampling switch 756, an error amplifier 760, comparators 770 and 778, a flip-flop component 774, a gate driver 776, a demagnetization detector 780, an oscillator 790, terminals 730, 732, and 734, a resistor 836, and a threshold generator 838. For example, the terminals 730, 732, and 734 are terminals for a controller chip 798. In another example, the switch 720 is a bipolar transistor. In yet another example, the exponential generator 710 is the exponential generator 500. According to one embodiment, signals 782, 792 and 712 are the signal 542, 532 and 526 respectively.

As shown in FIG. 7, the demagnetization detector 780 outputs a signal 782 to the exponential generator 710, and the oscillator 790 also outputs a signal 792 to the exponential generator 710. In one embodiment, the switch 720 is controlled by a signal 796 through the terminal 734. In another embodiment, a signal 764 for sensing a current that flows through the primary winding 740 is generated by the resistor 836 and received by the comparator 778.

According to one embodiment, the comparator 778 also receives a threshold signal 799 for over-current protection (OCP) from the threshold generator 838, and compares the threshold signal 799 with the signal 764. In response, the comparator 778, for example, outputs a comparison signal 775 to the flip-flop component 774. In another example, when the switch 720 is turned on, the current flowing through the primary winding 740 ramps up linearly, and the signal 764 (e.g., a current-sensing voltage) also ramps up linearly. In another example, if the signal 764 exceeds the threshold signal 799 in magnitude, the comparison signal 775 is at the logic high level.

In yet another example, when the switch 720 is turned off, the energy stored in the transformer is released to the output terminal. According to one embodiment, the demagnetization process starts, and the current flowing through the secondary winding 742 ramps down linearly. For example, when the demagnetization process almost ends and the current flowing through the secondary winding 742 approaches zero, a sampling signal 750 is generated by the sampling controller 754 to sample the feedback voltage at the terminal 732 by closing the sampling switch 756. In another example, after the sampling process is completed, the sampling switch 756 is open in response to the sampling signal 750. In yet another example, the sampled voltage is held on the capacitor 752, and compared with a reference voltage $V_{ref}$ such as 2V. The difference between the sampled/held voltage and the reference voltage $V_{ref}$ is amplified by the error amplifier 760 to generate an amplified signal 762 according to an embodiment. According to another embodiment, the amplified signal 762 is received by the negative input terminal of the comparator 770, whose positive input terminal receives the ramp signal 712. For example, the comparator 770 in response sends an output signal 772 to the flip-flop component 774.

In one embodiment, when the demagnetization process starts, the ramp signal 712 of the exponential generator 710 is restored to an initial value. For example, the ramp signal 712 is the signal 526, which is restored to $V_{refa}$ according to Equation 5 when the demagnetization process starts. In another example, after the demagnetization process is completed, the ramp signal 712 increases exponentially. In another example, if the ramp signal 712 becomes larger than the amplified signal 762 in magnitude, the comparison signal 772 is at the logic high level (e.g., at the "1" level).

As shown in FIG. 7, the flip-flop component 774 receives the signals 772 and 775, and in response generates a signal 777. For example, if the signal 772 is at the logic high level and the signal 775 is at the logic low level, the signal 777 is at the logic high level. In another example, if the signal 772 is at the logic high level and the signal 775 is also at the logic high level, the signal 777 is at the logic low level. In another embodiment, the signal 777 is received by the gate driver 776, which outputs the signal 796 to the switch 720 through the terminal 734. For example, if the signal 777 is at the logic high level, the signal 796 is also at the logic high level and causes the switch 720 to be turned on. In another example, if the signal 777 is at the logic low level, the signal 796 is also at the logic low level and causes the switch 720 to be turned off.

According to one embodiment, the threshold signal 799 for over-current protection (OCP) is generated by the threshold generator 838, which also receives the signal 777. For example, the threshold generator 838 processes information associated with the signal 777 and detects the magnitude of the switching frequency based on information associated with the signal 777. In another example, using the magnitude of the switching frequency, the threshold generator 838 determines the threshold signal 799 (e.g., a threshold voltage $V_{thoc1}$).

In one embodiment, the threshold voltage $V_{thoc1}$ increases with the increasing switching frequency, and decreases with the decreasing switching frequency. For example, $V_{thoc1}$ changes linearly with the switching frequency as follows:

$$V_{thoc1} = V_{thoc0} + k_{thoc} \times F_s \quad \text{(Equation 10)}$$

where $F_s$ represents the detected switching frequency for the switch 720. Additionally, $V_{thoc0}$ represents a predetermined constant voltage level, and $k_{thoc}$ represents a predetermined positive constant. In another example, with Equation 10, Equation 8 becomes $$P_o = \frac{1}{2} \times L \times \left( \frac{V_{thoc0} + k_{thoc} \times F_s}{R_s} \right)^2 \times F_s \times \eta \quad \text{(Equation 11)}$$

Figure 8:
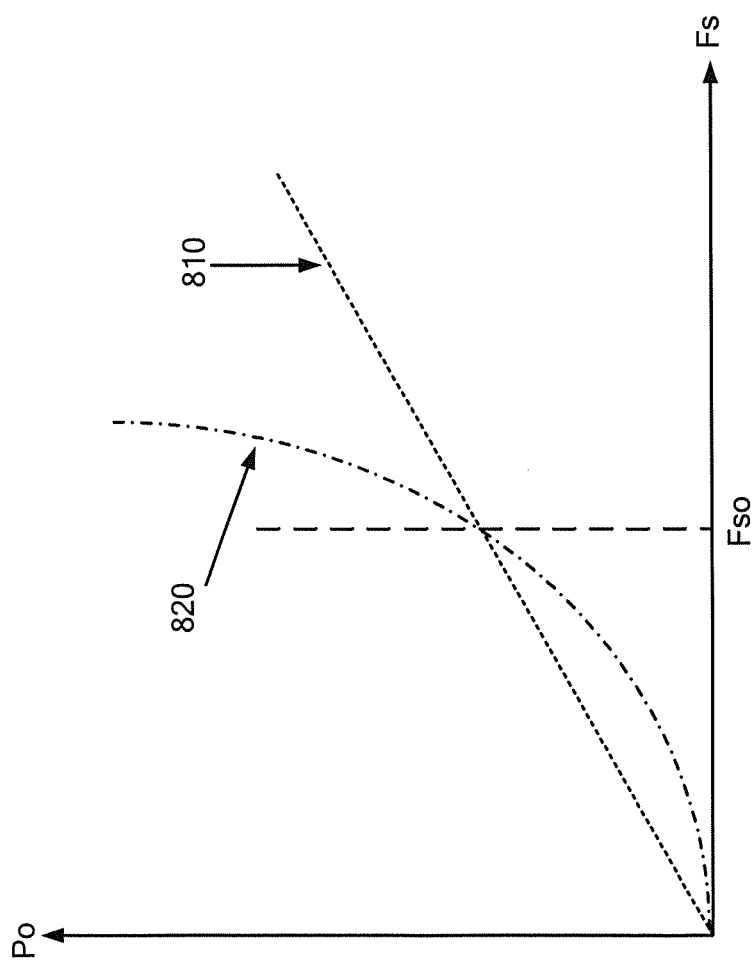
FIG. 8 is a simplified diagram showing a comparison between the output power with dynamic threshold adjustment and the output power with constant threshold level according to an embodiment of the present invention.

FIG. 8 is a simplified diagram showing a comparison between the output power with dynamic threshold adjustment and the output power with constant threshold level according to an embodiment of the present invention. This diagram is merely an example, which should not unduly limit the scope of the claims. One of ordinary skill in the art would recognize many variations, alternatives, and modifications.

A curve 810 represents the output power with constant threshold level as a function of switching frequency, and a curve 820 represents the output power with dynamic threshold adjustment as a function of switching frequency. For example, the curve 810 is made according to Equation 8, and the curve 820 is made according to Equation 11. As shown in FIG. 8, within the same range of switching frequency, the curve 820 provides a wider range of output power than the curve 810, if the lower end of the frequency range is close to zero and the higher end of frequency range is sufficiently larger than $F_{s0}$.

As discussed above and further emphasized here, FIG. 7 is merely an example, which should not unduly limit the scope of the claims. One of ordinary skill in the art would recognize many variations, alternatives, and modifications. For example, the threshold generator 838 is replaced by a current generator and a resistor.

Figure 9:
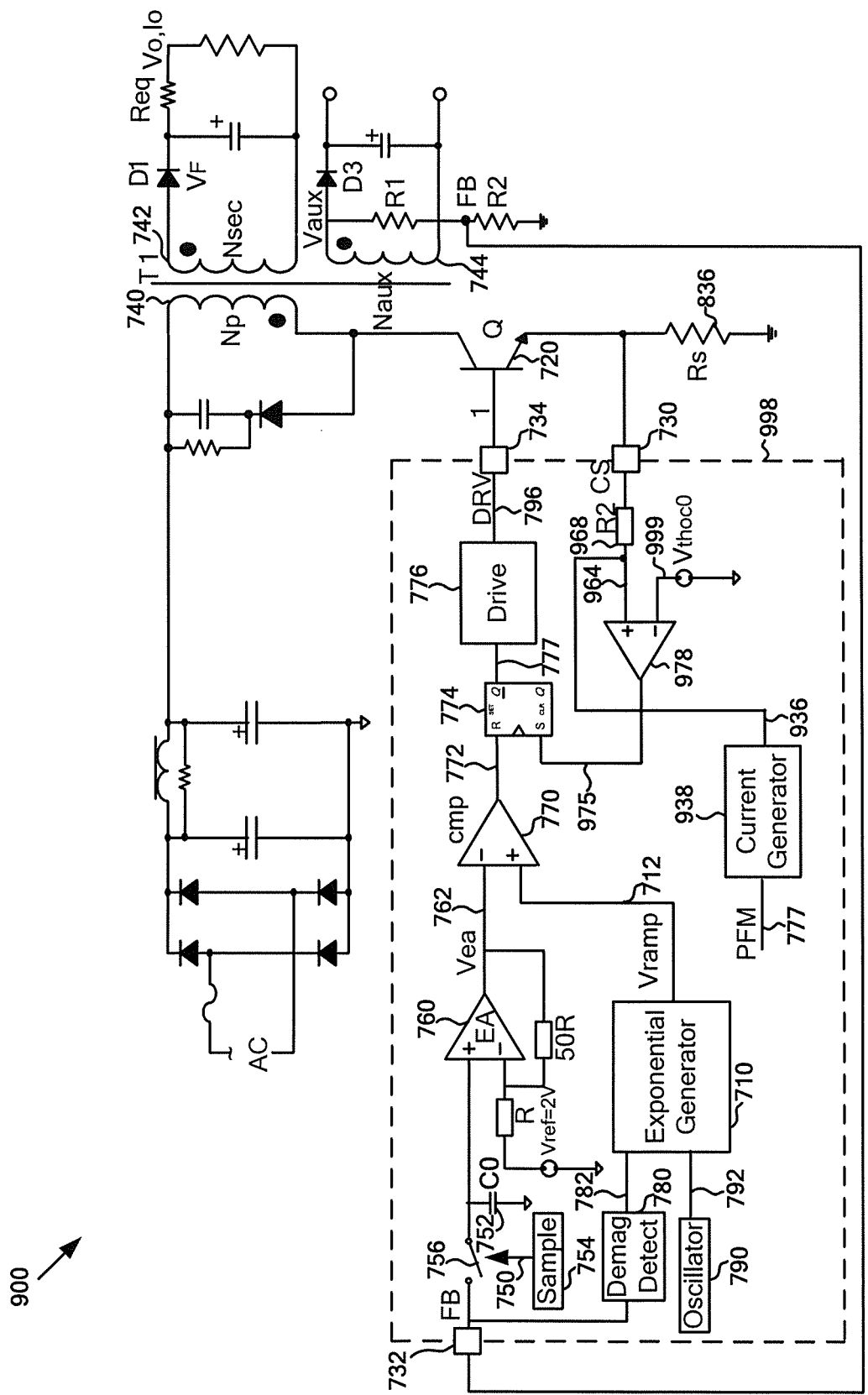
FIG. 9 is a simplified diagram showing a flyback power conversion system with dynamic threshold adjustment according to another embodiment of the present invention.

FIG. 9 is a simplified diagram showing a flyback power conversion system with dynamic threshold adjustment according to another embodiment of the present invention. This diagram is merely an example, which should not unduly limit the scope of the claims. One of ordinary skill in the art would recognize many variations, alternatives, and modifications.

The power conversion system 900 includes the exponential generator 710, the switch 720, the primary winding 740, the secondary winding 742, the auxiliary winding 744, the capacitor 752, the sampling controller 754, the sampling switch 756, the error amplifier 760, the comparator 770, the flip-flop component 774, the gate driver 776, the demagnetization detector 780, the oscillator 790, the terminals 730, 732, and 734, the resistor 836, a current generator 938, a resistor 968, and a comparator 978. For example, the terminals 730, 732, and 734 are terminals for a controller chip 998.

In comparison with FIG. 7, the threshold generator 838 is replaced by the current generator 938 and the resistor 968 in FIG. 9. In one embodiment, the current generator 938 receives the signal 777. For example, the current generator 938 processes information associated with the signal 777 and detects the magnitude of the switching frequency based on information associated with the signal 777. In another example, using the magnitude of the switching frequency, the current generator 938 determines a compensation current 936 that flows from the current generator 938 to the resistor 968, and consequently raises a signal 964 in magnitude.

As shown in FIG. 9, the signal 964 is received by the comparator 978, which also receives a threshold signal 999 for over-current protection (OCP) and compares the threshold signal 999 with the signal 964. In response, the comparator 978, for example, outputs a comparison signal 975 to the flip-flop component 774.

In one embodiment, the compensation current 936 decreases with the increasing switching frequency, and decreases with the increasing switching frequency. For example, the compensation current 936 changes linearly with the switching frequency. In another embodiment, the compensation current 936 that flows though at least the resistor 968, effectively reduces the threshold signal 799, by raising the signal 964 in magnitude. For example, the effective threshold signal increases with the increasing switching frequency, and decreases with the decreasing switching frequency. In another example, $$V_{thoc\_eff} = V_{thoc0} + k_{thoc} \times F_s \quad \text{(Equation 12)}$$

where $F_s$ represents the detected switching frequency for the switch 720. Additionally, $V_{thoc0}$ represents a predetermined constant magnitude for the threshold signal 799, and $k_{thoc}$ represents a predetermined positive constant.

As discussed above and further emphasized here, FIG. 9 is merely an example, which should not unduly limit the scope of the claims. One of ordinary skill in the art would recognize many variations, alternatives, and modifications. For example, one or more components of the current generator 936 is located outside of the controller chip 998.

Figure 10:
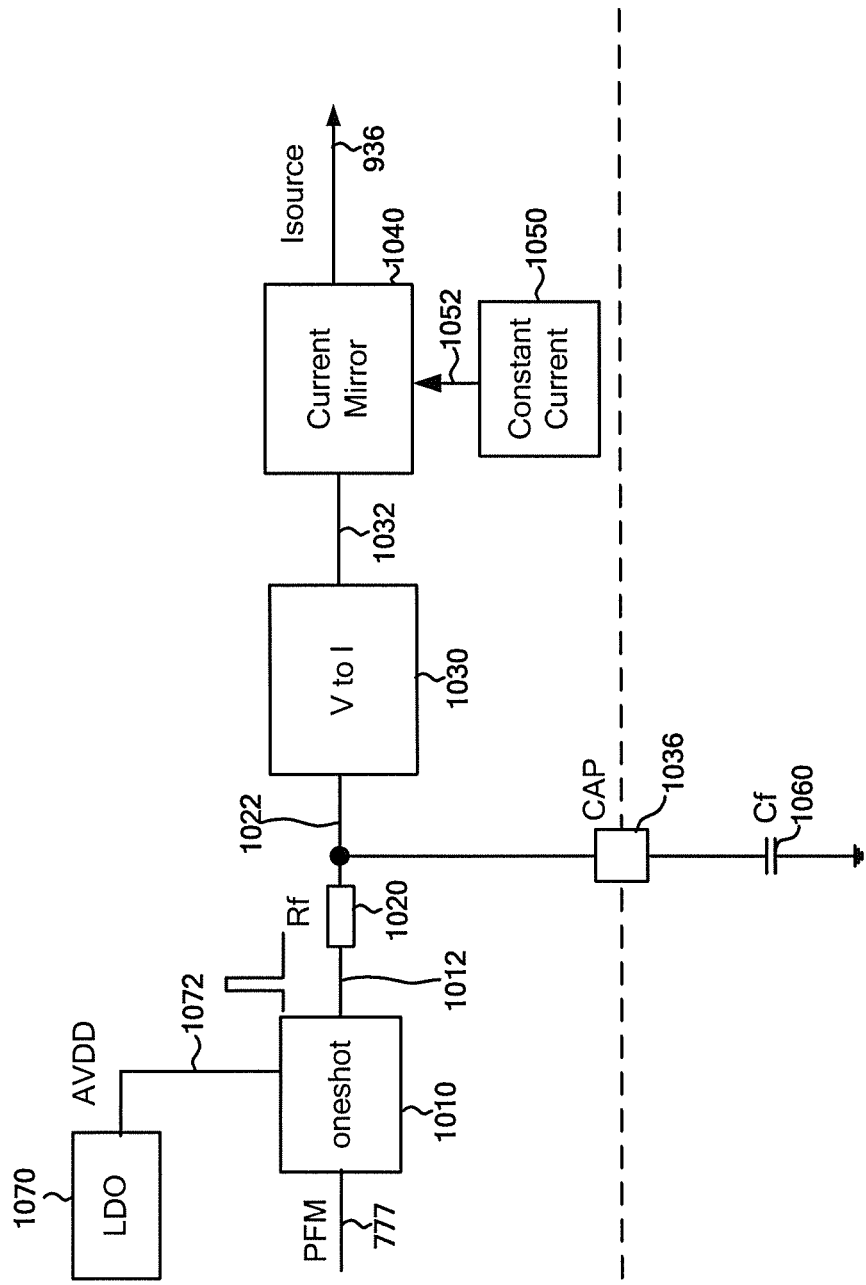
FIG. 10 is a simplified diagram showing the current generator for the power conversion system according to another embodiment of the present invention.

FIG. 10 is a simplified diagram showing the current generator 938 for the power conversion system 900 according to another embodiment of the present invention. This diagram is merely an example, which should not unduly limit the scope of the claims. One of ordinary skill in the art would recognize many variations, alternatives, and modifications.

For example, the current generator 938 includes a one-shot generator 1010, a resistor 1020, a voltage-to-current converter 1030, a current mirror 1040, a constant current generator 1050, and a capacitor 1060. In another example, the power conversion system 900 also includes a low-dropout regulator (LDO) 1070 and a terminal 1036.

As shown in FIG. 10, the one-shot generator 1010 receives the signal 777 and a voltage signal 1072 from the LDO 1070, and in response, generates a one-short signal 1012. For example, the one-shot signal 1012 has the same frequency as the signal 777 (e.g., the switching frequency). In another example, the one-shot signal 1012 has a constant pulse width (e.g., $T_a$) for different signal periods. According to one embodiment, the one-shot signal 1012 is processed by a low-pass filter that includes the resistor 1020 and the capacitor 1060 and generates a voltage signal 1022. For example, the low-pass filter has a RC time constant that is large enough to make the voltage signal 1022 approximately into a DC voltage signal.

According to another embodiment, the voltage signal 1022 is received by the voltage-to-current converter 1030, which converts the voltage signal 1022 into a current signal 1032. For example, the transconductance of the converter 1030 is $1/R_1$. In another example, the current signal 1032 is received by the current mirror 1040. According to yet another embodiment, the current mirror 1040 also receives a constant current 1052 from the constant current generator 1050. In response, the current mirror 1040, for example, generates the compensation current 936 as follows:

$$I_{R2} = I_{max} - \frac{T_a \times F_s \times V_{AVDD}}{R_1} \quad \text{(Equation 13)}$$

where $I_{R2}$ represents the compensation current 936, and $I_{max}$ represents the constant current 1052. Additionally, $T_a$ represents the constant pulse width of the one-shot signal 1012, and $F_s$ represents the switching frequency for the switch 720. Moreover, $V_{AVDD}$ represents the voltage signal 1072, and $1/R_1$ represents the transconductance of the voltage-to-current converter 1030.

In one embodiment, the resistance of the resistor 968 is much larger than the resistance of the resistor 836, and therefore, the compensation current 936 would raise the magnitude of the signal 964 by $$\Delta V = I_{max} \times R_2 - \frac{T_a \times F_s \times V_{AVDD} \times R_2}{R_1} \quad \text{(Equation 14)}$$

where $\Delta V$ represents the increase of the signal 964 due to the compensation current 936. Additionally, $R_2$ represents the resistance of the resistor 968. Consequently, as an example, the threshold signal 999 is reduced effectively by $\Delta V$ as follows:

$$V_{thoc\_eff} = V_c - \Delta V \quad \text{(Equation 15)}$$

where $V_{thoc\_eff}$ represents the effective threshold voltage, and $V_c$ represents the magnitude of the threshold signal 999. In one embodiment, the comparator 978 effectively compares $V_{thoc\_eff}$ with $V_s$, where $V_s$ represents the magnitude of the signal 964 with the compensation current 936 being assumed to be zero.

Combining Equations 14 and 15, one can obtain:

$$V_{thoc\_eff} = V_c - \Delta V \quad \text{(Equation 16)}$$
$$= V_c - \left(I_{max} \times R_2 - \frac{T_a \times F_s \times V_{AVDD} \times R_2}{R_1}\right)$$

Hence, according to one embodiment, referring to Equation 12, $$V_{thoc0} = V_c \times R_2 \quad \text{(Equation 17)}$$

$$k_{thoc} = \frac{T_a \times V_{AVDD} \times R_2}{R_1} \quad \text{(Equation 18)}$$

According to another embodiment, with Equations 16, 17, and 18, Equation 8 also becomes Equation 11.

Figure 11:
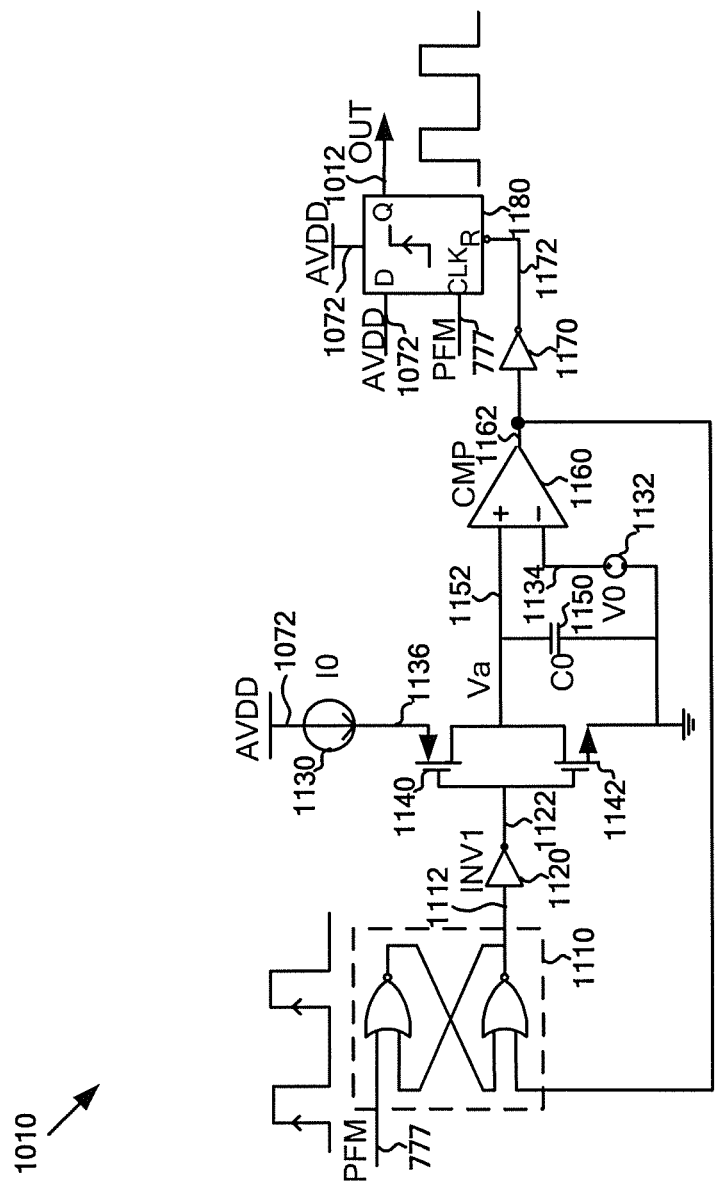
FIG. 11 is a simplified diagram showing the one-shot generator in the current generator for the power conversion system according to another embodiment of the present invention.

FIG. 11 is a simplified diagram showing the one-shot generator 1010 in the current generator 938 for the power conversion system 900 according to another embodiment of the present invention. This diagram is merely an example, which should not unduly limit the scope of the claims. One of ordinary skill in the art would recognize many variations, alternatives, and modifications. The one-shot generator 1010 includes a D flip-flop component 1110, NOT gates 1120 and 1170, a current source 1130, a voltage source 1132, a PMOS transistor 1140, an NMOS transistor 1142, a capacitor 1150, a comparator 1160, and a flip-flop component 1180.

As shown in FIG. 11, the D flip-flop component 1110 receives the signal 777 and outputs a signal 1112 to the NOT gate 1120, which in response generates a signal 1122. For example, in response to a rising edge of the signal 777, the signal 1112 changes to the logic high level (e.g., "1"), and the signal 1122 changes to the logic low level (e.g., "0").

If the signal 1122 is at the logic low level, the PMOS transistor 1140 is turned on and the NMOS transistor 1142 is turned off. Consequently, a constant current signal 1136 from the current source 1130 is used to charge the capacitor 1150, which generates a voltage signal 1152 (e.g., $V_a$), according to one embodiment. In another embodiment, the voltage generator 1132 generates a constant voltage signal 1134 (e.g., $V_0$). In yet another embodiment, both the constant voltage signal 1134 and the voltage signal 1152 are received by the comparator 1160, and in response, the comparator 1160 outputs a signal 1162 to the D flip-flop component 1110.

For example, if the voltage signal 1152 is larger than the constant voltage signal 1134, the signal 1162 is at the logic high level. In another example, if the signal 1162 changes to the logic high level, the signal 1112 changes to the logic low level, which causes the PMOS transistor 1140 to be turned off and the NMOS transistor 1142 to be turned on. Consequently, the capacitor 1150 is discharged, and the signal 1162 changes to the logic low level according to one embodiment. In another embodiment, if the signal 1162 changes to the logic low level, the signal 1122 remains at the logic low level until the next rising edge of the signal 777 is received by the D flip-flop component 1110.

As shown in FIG. 11, the signal 1162 is received by the NOT gate 1170, which outputs a signal 1172 to the flip-flop component 1180. In one embodiment, the flip-flop component 1180 also receives the voltage signal 1072 and the signal 777 and in response generates the signal 1012.

Figure 12:
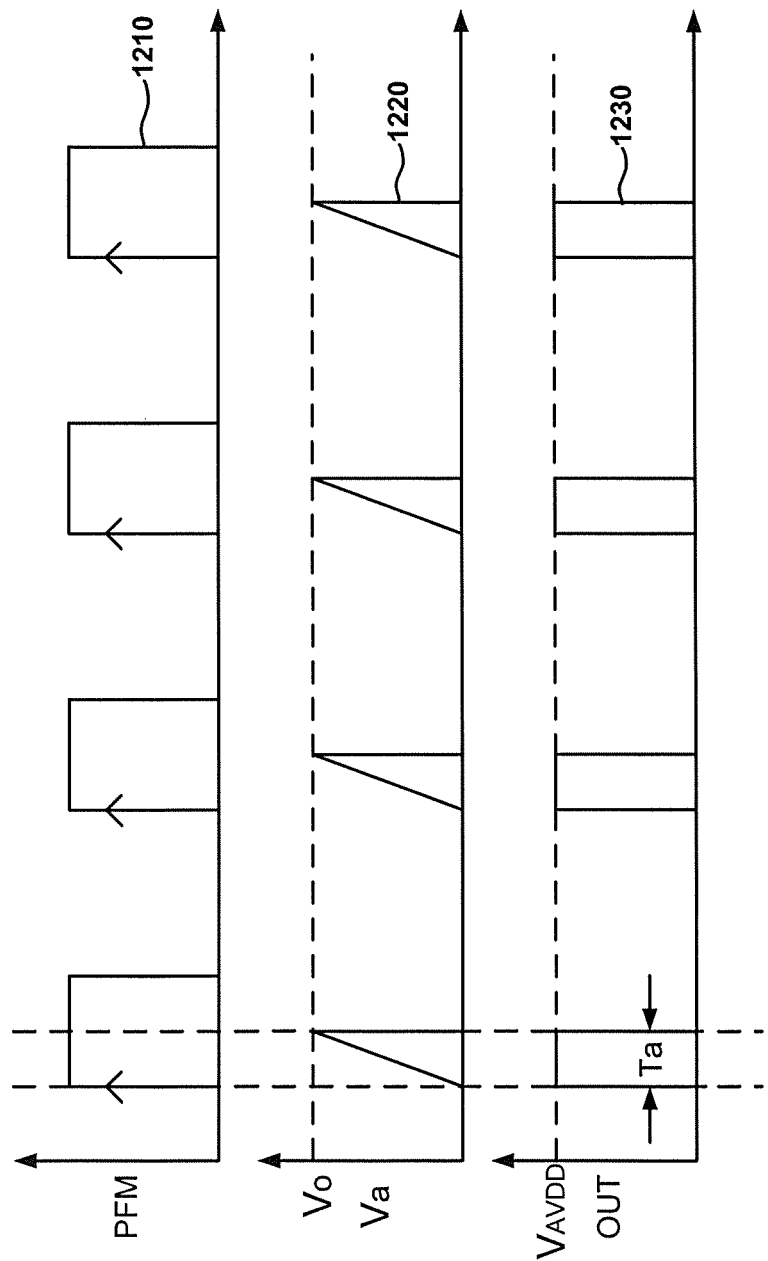
FIG. 12 is a simplified diagram showing certain waveforms for the one-shot generator in the current generator of the power conversion system according to another embodiment of the present invention.

FIG. 12 is a simplified diagram showing certain waveforms for the one-shot generator 1010 in the current generator 938 of the power conversion system 900 according to another embodiment of the present invention. This diagram is merely an example, which should not unduly limit the scope of the claims. One of ordinary skill in the art would recognize many variations, alternatives, and modifications.

A waveform 1210 represents the signal 777 as a function of time, a waveform 1220 represents the signal 1152 as a function of time, and a waveform 1230 represents the signal 1012 as a function of time. For example, the signal 1012 has the same frequency as the signal 777 (e.g., the switching frequency). In another example, the one-shot generator 1010 detects a rising edge of the signal 777, and upon each such detection, generates a pulse with a constant pulse width. In one embodiment, the pulse width is determined as follows:

$$T_a = \frac{C_0 \times V_0}{I_0} \quad \text{(Equation 19)}$$

where $T_a$ represents the constant pulse width of the signal 1012. Additionally, $C_0$ represents the capacitance of the capacitor 1150, $V_0$ represents the constant voltage signal 1134, and $I_0$ represents the constant current signal 1136.

For example, if the power conversion system 700 or 900 has an output voltage of 5V and an output current of 1 A at full load and an output voltage of 5V and an output current of 5 mA at no load, the switching frequency $F_s$ is equal to 40 KHz at full load (e.g., $F_{smax}$=40 KHz) and is equal to 1 KHz at no load (e.g., $F_{smin}$=1 KHz), with an output capacitance $C_o$ of 680 g. According to one embodiment, based on Equation 10 or 12, if $V_{thoc0}$=0.5V and $k_{thoc}$=0.0075 V/Hz, then $$P_{max}/P_{min} \approx 232 \quad \text{(Equation 20a)}$$

where $P_{max}$ represents the output power at $F_{smax}$=40 KHz and $P_{min}$ represents the output power at $F_{smin}$=1 KHz. Hence, the range of load changes is, for example, equal to approximately 232. According to another embodiment, if the load condition changes from no load to full load, the output voltage of the system 700 or 900 may temporarily drop by $$\Delta V_0 = \frac{I_o \times t}{C_o} \cong \frac{1A \times 1/1 \text{ KHz}}{680 \text{ } \mu F} = 0.148V \quad \text{(Equation 20b)}$$

Comparing to Equations 9a and 9b with Equations 20a and 20b respectively, the system 700 or 900 can significantly improve dynamic response and also widen range of load changes, without relying on the dummy load which may increase the standby power consumption, according to some embodiments of the present invention.

As discussed above and further emphasized here, FIG. 9 is merely an example, which should not unduly limit the scope of the claims. One of ordinary skill in the art would recognize many variations, alternatives, and modifications. For example, the resistor 968 is located outside of the controller chip 998.

Figure 13:
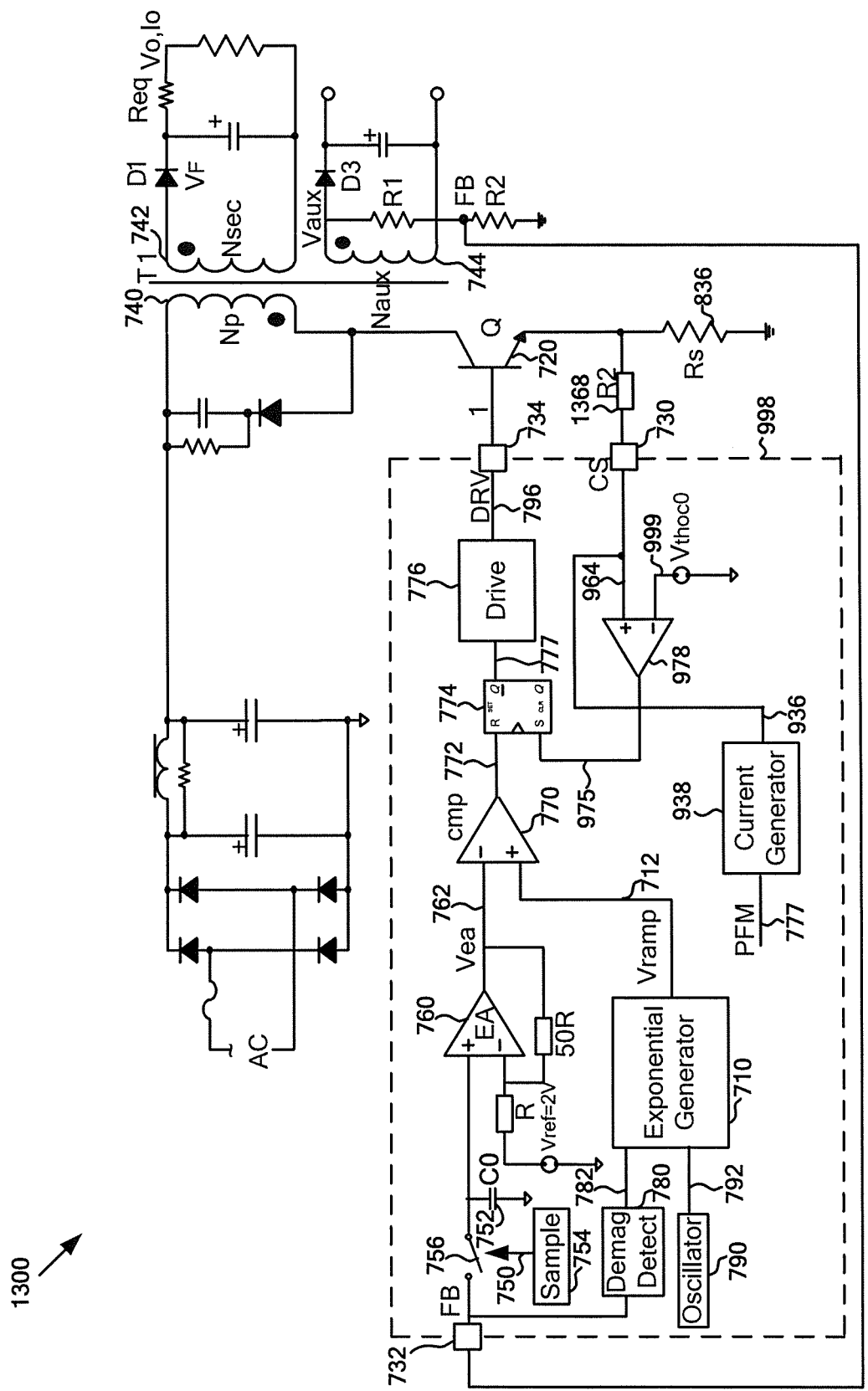
FIG. 13 is a simplified diagram showing a flyback power conversion system with dynamic threshold adjustment according to yet another embodiment of the present invention.

FIG. 13 is a simplified diagram showing a flyback power conversion system with dynamic threshold adjustment according to yet another embodiment of the present invention. This diagram is merely an example, which should not unduly limit the scope of the claims. One of ordinary skill in the art would recognize many variations, alternatives, and modifications. In comparison with FIG. 9, the resistor 968 of the power conversion system 900 is replaced by the resistor 1368 of the power conversion system 1300 in FIG. 13.

Figure 14:
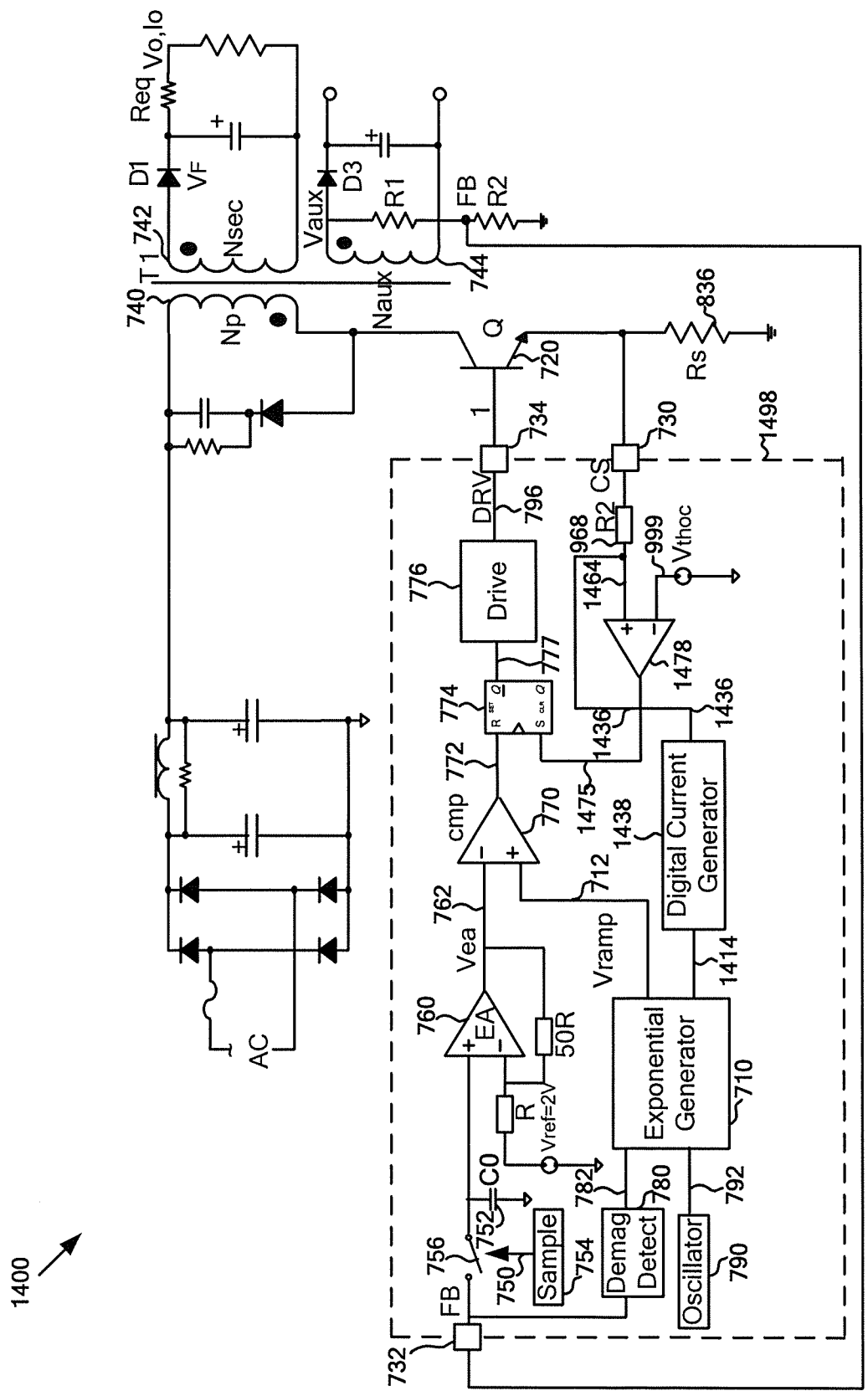
FIG. 14 is a simplified diagram showing a flyback power conversion system with dynamic threshold adjustment according to yet another embodiment of the present invention.

FIG. 14 is a simplified diagram showing a flyback power conversion system with dynamic threshold adjustment according to yet another embodiment of the present invention. This diagram is merely an example, which should not unduly limit the scope of the claims. One of ordinary skill in the art would recognize many variations, alternatives, and modifications.

The power conversion system 1400 includes the exponential generator 710, the switch 720, the primary winding 740, the secondary winding 742, the auxiliary winding 744, the capacitor 752, the sampling controller 754, the sampling switch 756, the error amplifier 760, the comparators 770, the flip-flop component 774, the gate driver 776, the demagnetization detector 780, the oscillator 790, the terminals 730, 732, and 734, the resistor 836, the resistor 968, a digital current generator 1438, and a comparator 1478. For example, the terminals 730, 732, and 734 are terminals for a controller chip 1498.

In comparison with FIG. 9, the current generator 938 is replaced by the digital current generator 1438 in FIG. 14. In one embodiment, the digital current generator 1438 receives a signal 1414 from the exponential generator 710. For example, the exponential generator 710 is the exponential generator 500, and the signals 782, 792, 712 and 1414 are the signals 542, 532, 526 and 554 respectively. In another example, the digital current generator 1438 processes information associated with the signal 1414 and determines a compensation current 1436 that flows from the digital current generator 1438 to the resistor 968, and consequently raises the signal 1464 in magnitude.

As shown in FIG. 14, the signal 1464 is received by the comparator 1478, which also receives the threshold signal 999 for over-current protection (OCP) and compares the threshold signal 999 with the signal 1464. In response, the comparator 1478, for example, outputs a comparison signal 1475 to the flip-flop component 774.

Figure 15:
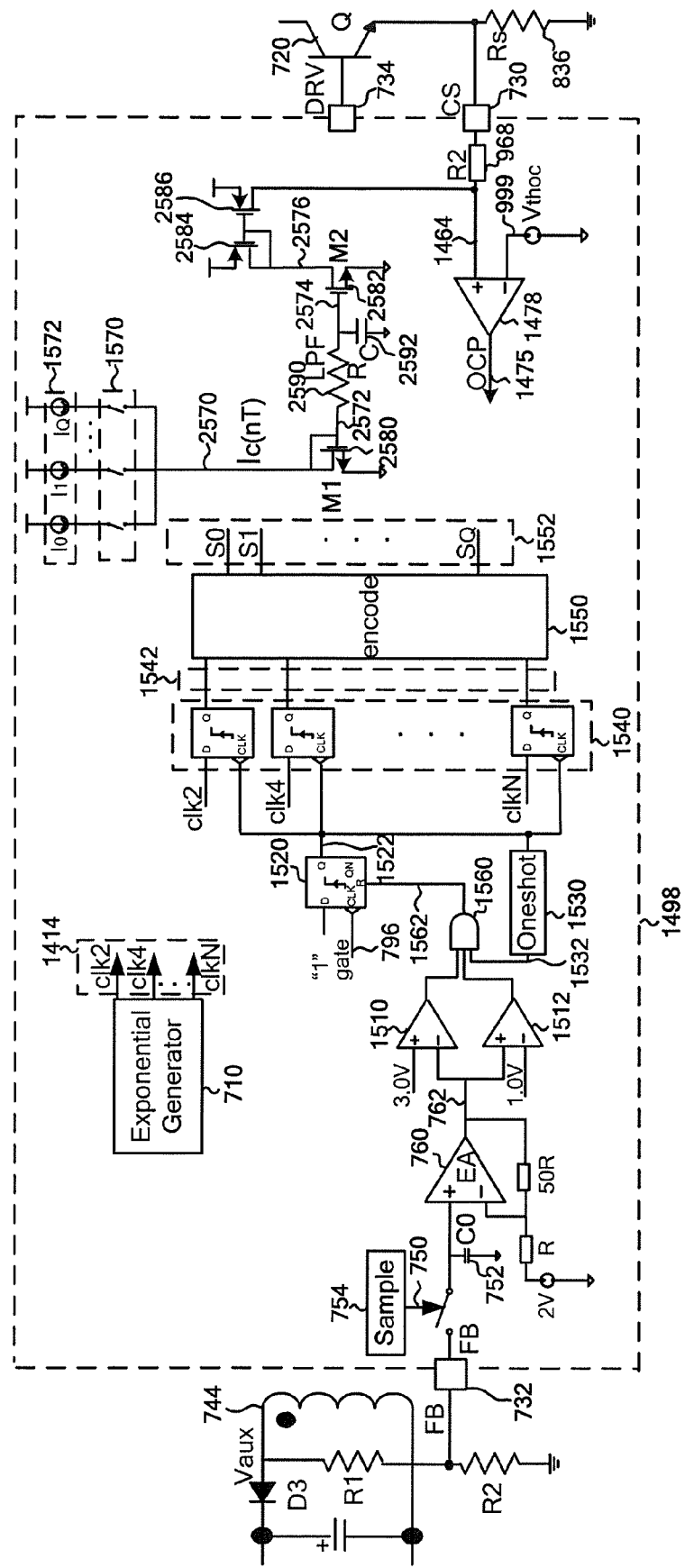
FIG. 15 is a simplified diagram showing the digital current generator of the flyback power conversion system with dynamic threshold adjustment according to one embodiment of the present invention.

FIG. 15 is a simplified diagram showing the digital current generator 1438 of the flyback power conversion system 1400 with dynamic threshold adjustment according to one embodiment of the present invention. This diagram is merely an example, which should not unduly limit the scope of the claims. One of ordinary skill in the art would recognize many variations, alternatives, and modifications. The digital current generator 1438 includes comparators 1510 and 1512, a flip-flop component 1520, a signal generator 1530, flip-flop components 1540, an encoding component 1550, an AND gate 1560, switches 1570, current sources 1572, transistors 2580, 2582, 2584, and 2586, a resistor 2590, and a capacitor 2592. As shown, both the resistor 2590, and the capacitor 2592 are on the controller chip 1498.

Referring to FIG. 14, the digital current generator 1438 receives the signals 1414 and generate the compensation current 1436 based on at least information associated with the signals 1414. For example, the signals 1414 are the signals 554. In one embodiment, the signals 1414 include signals clk2, clk4, ..., clkm, ..., and clkN with 2≤m≤N, and m and N are each equal to a power of 2 (e.g., 2 to the power of an integer). In another embodiment, when the clkm signal rises from a logic low level to a logic high level (e.g., from the "0" level to the "1" level) for the first time since the reset, the time period since the last reset is $$n \times T = \frac{m \times T}{2},$$

where n represents the time period since the last reset in terms of the number of the clock periods and T represents the clock period of the clock signal 792.

Returning to FIG. 15, the signal 762 is received by both comparators 1510 and 1512 according to an embodiment. For example, the comparator 1510 determines whether the voltage magnitude of the signal 762 is lower than 3V, and the comparator 1512 determines whether the voltage magnitude of the signal 762 is higher than 1V. In another example, if the voltage magnitude of the signal 762 is determined to be between 1V and 3V, the power conversion system 1400 is determined to operate in the constant-voltage (CV) mode.

According to one embodiment, if the voltage magnitude of the signal 762 is determined to be between 1V and 3V, and if a signal 1532 generated by the signal generator 1530 is at a logic high level, the AND gate 1560 sends to a flip-flop component 1520 a signal 1562, which is also at the logic high level. For example, the signal generator 1530 is a one-shot signal generator. In another example, the flip-flop component 1520 also receives at least the signal 796, and generates a signal 1522 based on at least information associated with the signals 796 and 1562.

According to another embodiment, the signal 1522 is received by the flip-flop components 1540, which also receive the signals 1414. For example, the signals 1414 represent n×T, where n represents the time since the end of previous $t_{Demag}$ in terms of the number of the clock periods and T represents the clock period of the clock signal 792. In another example, the signal 1522 is used to lock signals 1542 so that the signals 1542 reflect the value of n at the end of $t_{ramp}$ immediately before the subsequent $t_{on}$, so the signals 1542 indicate $n_{ramp} \times T$.

In response, the flip-flop components 1540 outputs the signals 1542 to the encoding component 1550 based on at least information associated with the signals 1414 and 1522. For example, the flip-flop components 1540 include flip-flop components $1540_2, 1540_4, \ldots, 1540_m, \ldots,$ and $1540_N$, the signals 1414 include the signals clk2, clk4, ..., clkm, ..., and clkN, and the signals 1542 include the signals $1542_2$, $1542_4, \ldots, 1542_m, \ldots,$ and $1542_N$. In one embodiment, m and N are each equal to a power of 2 (e.g., 2 to the power of an integer), with $2 \leq m \leq N$. In yet another example, the flip-flop components $1540_2, 1540_4, \ldots, 1540_m, \ldots,$ and $1540_N$ receive at least the signals clk2, clk4, ..., clkm, ..., and clkN respectively and generates the signals $1542_2, 1542_4, \ldots$, $1542_m, \ldots,$ and $1542_N$ respectively.

According to one embodiment, if at the rising edge of the signal 1522, the signal clkm is at a logic high level (e.g., at the "1" level), the signal $1542_m$ is also at the logic high level (e.g., at the "1" level), with $2 \leq m \leq N$. According to another embodiment, if at the rising edge of the signal 1522, the signal clkm is at a logic low level (e.g., at the "0" level), the signal $1542_m$ is also at the logic low level (e.g., at the "0" level), with $2 \leq m \leq N$.

As shown in FIG. 15, the encoding component 1550 performs digital encoding based on information associated with the signals 1542 and generate signals 1552, which are used to determine the magnitude of the compensation current 1436. For example, the signals 1552 includes signals $S_0, S_1, \ldots,$ $S_q, \ldots,$ and $S_Q$. Both q and Q are integers, with $0 \leq q \leq Q$. In another example, the compensation current 1436 has a non-linear relationship with $n_{ramp} \times T$ as follows:

$$I_c(n_{ramp} \times T) = I_{max} - C \times F_s \qquad \text{(Equation 21)}$$

where $$F_s = \frac{1}{t_{ON} + t_{Demag} + n_{ramp} \times T} \qquad \text{(Equation 22)}$$

Additionally, $I_{max}$ and C each represent a constant. Moreover, $t_{ON}$ represents the time period when the switch 720 remains turned on, and $t_{Demag}$ represents the time period of the demagnetization process. Also, $t_{ramp}$ represents the time period for the signal 712 to rise to the level of the signal 762 in magnitude. For example, $t_{ramp}$ is equal to $n_{ramp} \times T$. In another example, $I_{max}$ and C each are determined by certain components of the system 1400.

Comparing Equations 13 and 22, one can determine C of Equation 22 for the compensation current 1436 corresponds to $(T_a \times V_{AVDD})/R_1$ of Equation 13 for the compensation current 936 according to one embodiment. According to another embodiment, the compensation current 1436 would raise the magnitude of the signal 1464 by $$\Delta V = I_{max} \times R_2 - C \times F_s \times R_2 \qquad \text{(Equation 23)}$$

where $\Delta V$ represents the increase of the signal 1464 due to the compensation current 1436. Additionally, $R_2$ represents the resistance of the resistor 968. Consequently, as an example, the threshold signal 999 is reduced effectively by $\Delta V$ as follows:

$$V_{thoc\_eff} = V_c - \Delta V \qquad \text{(Equation 24)}$$

where $V_{thoc\_eff}$ represents the effective threshold voltage, and $V_c$ represents the magnitude of the threshold signal 999. In one embodiment, the comparator 1478 effectively compares $V_{thoc\_eff}$ with $V_s$, where $V_s$ represents the magnitude of the signal 1464 with the compensation current 1436 being assumed to be zero.

Combining Equations 23 and 24, one can obtain:

$$V_{thoc\_eff} = V_c - \Delta V = V_c - (I_{max} \times R_2 - C \times F_s \times R_2) \qquad \text{(Equation 25)}$$

Hence, according to one embodiment, referring to Equation 12, $$V_{thoc0} = V_c - I_{max} \times R_2 \qquad \text{(Equation 26)}$$

$$k_{thoc} = C \times R_2 \qquad \text{(Equation 27)}$$

According to another embodiment, with Equations 25, 26, and 27, Equation 8 also becomes Equation 11.

As shown in FIG. 15, the signals 1552 are used to control the switches 1570 according to some embodiments. For example, the switches 1570 include switches $1570_0$, $1570_1, \ldots, 1570_8, \ldots,$ and $1570_Q$. Both q and Q are integers, with $0 \leq q \leq Q$. In another example, the switches $1570_0$, $1570_1, \ldots, 1570_8, \ldots,$ and $1570_Q$ are controlled by the signals $S_0, S_1, \ldots, S_q, \ldots,$ and $S_Q$ respectively. In one embodiment, if the signal $S_q$ is at a logic high level (e.g., the "1" level), the switch $1570_q$ is closed. In another embodiment, if the signal $S_q$ is at a logic low level (e.g., the "0" level), the switch $1570_q$ is open.

According to certain embodiments, the switches 1570 are connected to the current sources 1572. For example, the current sources 1572 include current sources $I_0, I_1, \ldots, I_q, \ldots,$ and $I_Q$. Both q and Q are integers, with $0 \leq q \leq Q$. In another example, the switches $1570_0, 1570_k, \ldots, 1570_q, \ldots,$ and $1570_Q$ are connected to the current sources $I_0, I_1, \ldots,$ $I_q, \ldots,$ and $I_Q$ respectively. In one embodiment, if the switch $1570_q$ is closed, the current source $I_q$ affects the compensation current 1436. In another embodiment, if the switch $1570_q$ is open, the current source $I_q$ does not affect the compensation current 1436.

As shown in FIG. 15, the compensation current 1436 is filtered by a low pass filter (LPF). For example, the low pass filter (LPF) includes the resistor 2590 and the capacitor 2592. In another example, the transistor 2580 converts a current 2570 to a voltage 2572 for low-pass filtering, the transistor 2582 converts a filtered voltage 2574 to another voltage 2576, and the transistors 2584 and 2586 convert the voltage 2576 to the compensation current 1436.

In one embodiment, the encoding component 1550 performs a segmented curve fitting process to approximately implement Equation 21 with other components of the digital current generator 1438. In another embodiment, the following 6-segment curve fitting process is performed:

Segment 1: $I_c(n_{ramp} \times T) = 0$ (µA) if $n_{ramp} \times T < 16 \times T$ according to one embodiment. For example, when the clkj signals ($32 < j \leq N$) are all at the logic low level (e.g., the "0" level), the signals $S_0, S_1, \ldots, S_q, \ldots,$ and $S_Q$ are all at the logic low level (e.g., the "0" level) with Q equal to 15.

Segment 2: $I_c(n_{ramp} \times T) = \frac{1}{2} \times (n_{ramp} \times T - 16 \times T)$ (µA) if $16 \times T \leq n_{ramp} \times T < 32 \times T$ according to one embodiment. For example, when the clk32 signal changes to the logic high level (e.g., the "1" level), and the clkj signals ($64 < j \leq N$) all remain at the logic low level (e.g., the "0" level), the signals $S_0, S_1, S_2,$ and $S_3$ change to the logic high level (e.g., the "1" level) sequentially with an interval of $2 \times T$. In another example, the magnitudes of the current sources $I_0, I_1, I_2,$ and $I_3$ are each equal to 1 µA.

Segment 3: $I_c(n_{ramp} \times T) = \frac{1}{8} \times (n_{ramp} \times T - 32 \times T) + 8$ (µA) if $32 \times T \leq n_{ramp} \times T < 128 \times T$ according to one embodiment. For example, when the clk128 signal changes to the logic high level (e.g., the "1" level), and the clkj signals (256<j≤N) all remain at the logic low level (e.g., the "0" level), the signals $S_4$, $S_5$, $S_6$, and $S_7$ change to the logic high level (e.g., the "1" level) sequentially with an interval of 8×T, with the signals $S_0$, $S_1$, $S_2$, and $S_3$ remaining at the logic high level (e.g., the "1" level). In another example, the magnitudes of the current sources $I_4$, $I_5$, $I_6$, and $I_7$ are each equal to 1 µA.

Segment 4:

$$I_c(n_{ramp} \times T) = \frac{0.75}{32} \times (n_{ramp} \times T - 128 \times T) + 20 \ (\mu A)$$

if $128 \times T \leq n_{ramp} \times T < 512 \times T$ according to one embodiment. For example, when the clk512 signal changes to the logic high level (e.g., the "1" level), and the clkj signals (1024<j≤N) all remain at the logic low level (e.g., the "0" level), the signals $S_8$, $S_9$, $S_{10}$, and $S_{11}$ change to the logic high level (e.g., the "1" level) sequentially with an interval of 32×T, with the signals $S_0$, $S_1$, ..., and $S_7$ remaining at the logic high level (e.g., the "1" level). In another example, the magnitudes of the current sources $I_8$, $I_9$, $I_{10}$, and $I_{11}$ are each equal to 0.75 µA.

Segment 5:

$$I_c(n_{ramp} \times T) = \frac{1.25}{128} \times (n_{ramp} \times T - 512 \times T) + 29 \ (\mu A)$$

if $512 \times T \leq n_{ramp} \times T < 2048 \times T$ according to one embodiment. For example, when the clk64 signal changes to the logic high level (e.g., the "1" level), and the clkj signals (2048<j≤N) all remain at the logic low level (e.g., the "0" level), the signals $S_{12}$, $S_{13}$, $S_{14}$, and $S_{15}$ change to the logic high level (e.g., the "1" level) sequentially with an interval of 128×T, with the signals $S_0$, $S_1$, ..., and $S_{11}$ remaining at the logic high level (e.g., the "1" level). In another example, the magnitudes of the current sources $I_{12}$, $I_{13}$, $I_{14}$, and $I_{15}$ are each equal to 1.25 µA.

Segment 6: $I_c(n_{ramp} \times T) = 44$ (µA) if $2048 \times T < n_{ramp} \times T$ according to one embodiment. For example, when the clk4096 signal changes to the logic high low level (e.g., the "1" level), the signals $S_0$, $S_1$, ..., $S_q$, ..., and $S_Q$ are all at the logic high level (e.g., the "1" level) with Q equal to 15.

According to certain embodiments, if the voltage magnitude of the signal 762 stays between 1V and 3V for 8×T, the power conversion system 1400 is determined to operate with stability in the constant voltage (CV) mode. For example, in response, the digital current generator 1438 uses the signal 1522 to control the flip-flop components 1540 in order to store the signals 1414 that indicate the $t_{ramp}$ magnitude of $n_{ramp} \times T$. In another example, the signal 1542 is received by the encoding component 1550, which performs a digital encoding process and generates the signals 1552. In yet another example, the signals 1552 are used to control the switches 1570 connected to the current sources 1572, and to determine the magnitude of the compensation current 1436.

As discussed above and further emphasized here, FIG. 15 is merely an example, which should not unduly limit the scope of the claims. One of ordinary skill in the art would recognize many variations, alternatives, and modifications. For example, the resistor 2590 is on the controller chip 1498, but the capacitor 2592 is not on the controller chip 1498. In another example, the capacitor 2592 is connected to the resistor 2590 through a terminal of the controller chip 1498.

Figure 16:
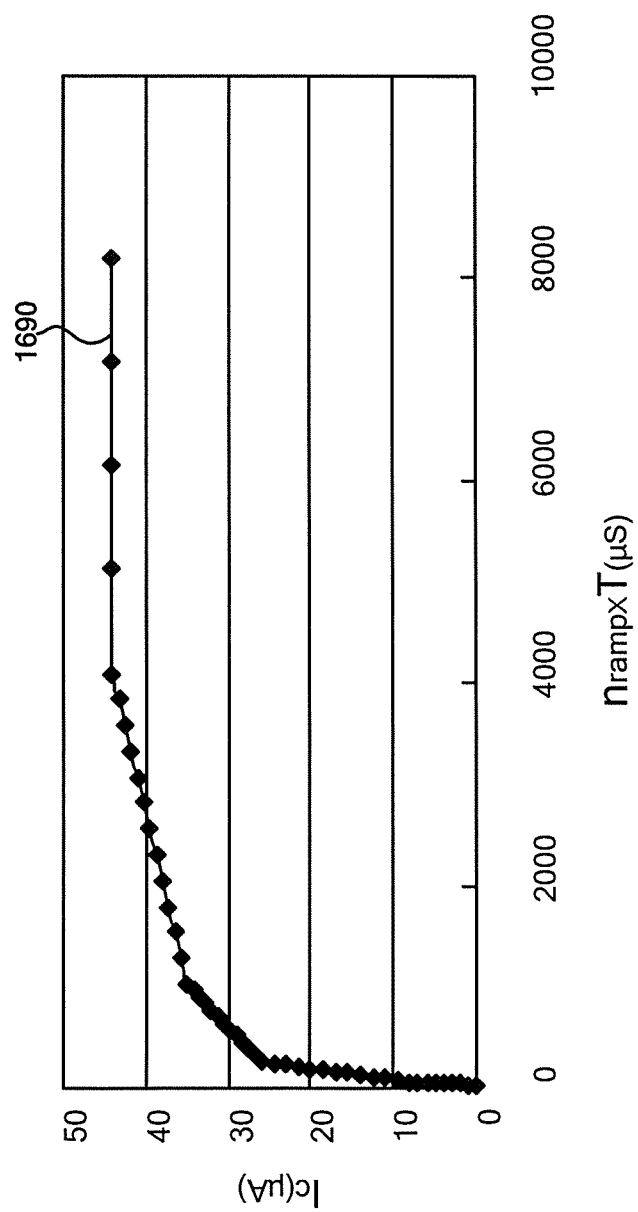
FIG. 16 is a simplified diagram showing the compensation current generated by the digital current generator of the flyback power conversion system as a function of $n_{ramp} \times T$ according to an embodiment of the present invention.

FIG. 16 is a simplified diagram showing the compensation current 1436 generated by the digital current generator 1438 of the flyback power conversion system 1400 as a function of $n_{ramp} \times T$ according to an embodiment of the present invention. This diagram is merely an example, which should not unduly limit the scope of the claims. One of ordinary skill in the art would recognize many variations, alternatives, and modifications. The curve 1690 represents the compensation current 1436 as a function of $n_{ramp} \times T$ generated by the digital current generator 1438 as shown in FIG. 15 and is consistent with Equations 21 and 22. For example, T is equal to 2 µS.

Figure 17:
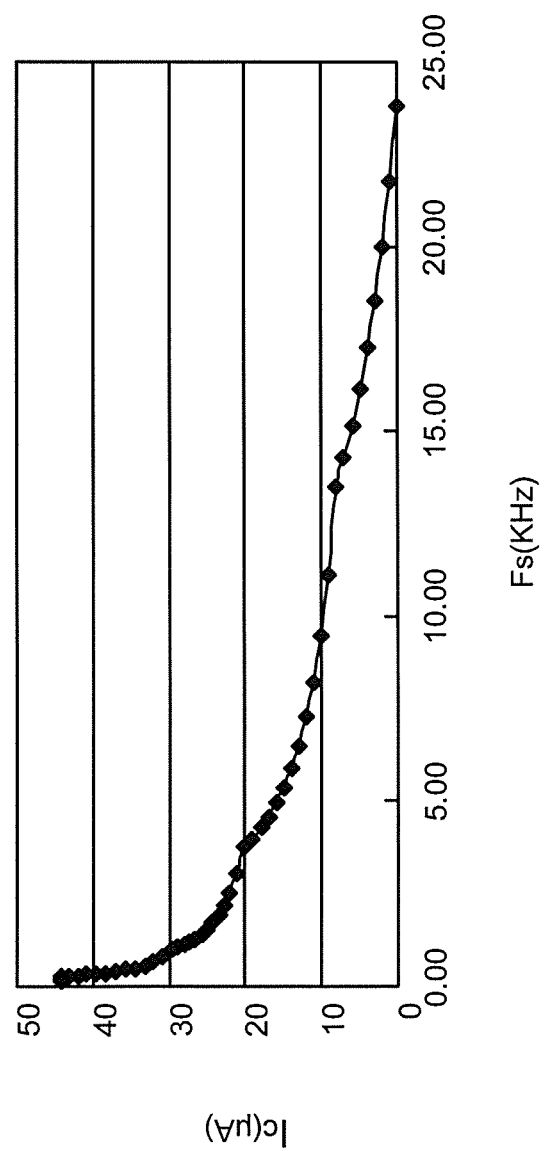
FIG. 17 is a simplified diagram showing the compensation current generated by the digital current generator of the flyback power conversion system as a function of $F_s$ according to an embodiment of the present invention.

FIG. 17 is a simplified diagram showing the compensation current 1436 generated by the digital current generator 1438 of the flyback power conversion system 1400 as a function of $F_s$ according to an embodiment of the present invention. This diagram is merely an example, which should not unduly limit the scope of the claims. One of ordinary skill in the art would recognize many variations, alternatives, and modifications. The curve 1790 represents the compensation current 1436 as a function of $F_s$ generated by the digital current generator 1438 as shown in FIG. 15 and is consistent with Equation 21. For example, T is equal to 2 µS.

According to another embodiment, a system for adjusting a threshold of a power conversion system includes a threshold generator configured to receive a first signal and generate a threshold signal based on at least information associated with the first signal, a comparator configured to receive the threshold signal and a second signal and generate a comparison signal, and a gate driver configured to generate a drive signal based on at least information associated with the comparison signal. The gate driver is coupled to at least a switch configured to receive the drive signal and affect a current flowing through a primary winding coupled to a secondary winding. If the second signal is larger than the threshold signal in magnitude, the drive signal causes the switch to open. The drive signal is associated with a switching frequency. The second signal increases with the increasing current in magnitude and decreases with the decreasing current in magnitude, and the threshold signal increases with the increasing switching frequency in magnitude and decreases with the decreasing switching frequency in magnitude. For example, the system is implemented according to at least FIG. 7.

According to another embodiment, a system for adjusting an effective threshold of a power conversion system includes a current generator configured to receive a first signal and generate a first current based on at least information associated with the first signal, and a first comparator configured to receive a predetermined threshold voltage and a first voltage and generate a first comparison signal. The first voltage is a sum of a second voltage and a third voltage. Additionally, the system includes a gate driver configured to generate a drive signal based on at least information associated with the comparison signal. The gate driver is coupled to at least a switch configured to receive the drive signal and affect a second current flowing through a primary winding coupled to a secondary winding. If the first voltage is larger than the predetermined threshold voltage in magnitude, the drive signal causes the switch to open. The drive signal is associated with a switching frequency. The second voltage increases with the increasing first current in magnitude and decreases with the decreasing first current in magnitude, and the third voltage increases with the increasing second current in magnitude and decreases with the decreasing second current in magnitude. The first current decreases with the increasing switching frequency in magnitude and increases with the decreasing switching frequency in magnitude. For example, the system is implemented according to at least FIG. 9, FIG. 13, and/or FIG. 14.

According to yet another embodiment, a method for adjusting a threshold of a power conversion system includes receiving a first signal, processing information associated with the first signal, and generating a threshold signal based on at least information associated with the first signal. Additionally, the method includes receiving the threshold signal and a second signal, and generating a comparison signal based on at least information associated with the threshold signal and the second signal. Moreover, the method includes processing information associated with the comparison signal, and generating a drive signal based on at least information associated with the first comparison signal to affect a current flowing through a primary winding coupled to a secondary winding. If the second signal is larger than the threshold signal in magnitude, the drive signal causes the current to decrease. The drive signal is associated with a switching frequency. The second signal increases with the increasing current in magnitude and decreases with the decreasing current in magnitude, and the threshold signal increases with the increasing switching frequency in magnitude and decreases with the decreasing switching frequency in magnitude. For example, the method is implemented according to at least FIG. 7.

According to yet another embodiment, a method for adjusting an effective threshold of a power conversion system includes receiving a first signal, processing information associated with the first signal, and generating a first current based on at least information associated with the first signal. Additionally, the method includes receiving a predetermined threshold voltage and a first voltage, and generating a first comparison signal based on at least information associated with the predetermined threshold voltage and the first voltage. The first voltage is a sum of a second voltage and a third voltage. Moreover, the method includes processing information associated with the first comparison signal, and generating a drive signal based on at least information associated with the first comparison signal to affect a second current flowing through a primary winding coupled to a secondary winding. If the first voltage is larger than the predetermined threshold voltage in magnitude, the drive signal causes the second current to decrease. The drive signal is associated with a switching frequency. The second voltage increases with the increasing first current in magnitude and decreases with the decreasing first current in magnitude, and the third voltage increases with the increasing second current in magnitude and decreases with the decreasing second current in magnitude. The first current decreases with the increasing switching frequency in magnitude and increases with the decreasing switching frequency in magnitude. For example, the method is implemented according to at least FIG. 9, FIG. 13, and/or FIG. 14.

Many benefits are achieved by way of the present invention over conventional techniques. Certain embodiments of the present invention dynamically adjust the on-time duration with pulse-frequency modulation. Some embodiments of the present invention raise the minimum frequency (e.g., the frequency under no load condition) and improve dynamic response to load changes, without reducing range of load changes or increasing standby power consumption.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for adjusting a threshold of a power converter, the system comprising:
 a threshold generator configured to receive a first signal modulated at a switching frequency, process information associated with the first signal, detect a magnitude of the switching frequency of the first signal, and generate a threshold signal based on at least information associated with the detected magnitude of the switching frequency of the first signal;
 a comparator configured to receive the threshold signal and a second signal and generate a comparison signal; and
 a gate driver configured to output a drive signal to a switch based on at least information associated with the comparison signal in order to affect a current flowing through a primary winding coupled to a secondary winding;
 wherein, if the second signal is larger than the threshold signal in magnitude, the drive signal causes the switch to open;
 wherein:
  the drive signal is associated with the switching frequency;
  the second signal increases with the increasing current in magnitude and decreases with the decreasing current in magnitude; and
  the threshold signal increases in response to the increasing switching frequency in magnitude and decreases in response to the decreasing switching frequency in magnitude.

2. The system of claim 1 wherein the threshold signal increases linearly with the increasing switching frequency in magnitude and decreases linearly with the decreasing switching frequency in magnitude.

3. The system of claim 1 wherein:
 the switch includes a transistor; and
 if the second signal is larger than the threshold signal in magnitude, the drive signal causes the switch to open by turning off the transistor.

4. The system of claim 1, and further comprising:
 a flip-flop component configured to receive the comparison signal and output the first signal to the gate driver;
 wherein the gate driver is further configured to receive the first signal, process information associated with the first signal and generate the drive signal based on at least information associated with the first signal.

5. A system for adjusting an effective threshold of a power converter, the system comprising:
 a current generator configured to receive a first signal modulated at a switching frequency, process information associated with the first signal, detect a magnitude of the switching frequency of the first signal, and generate a first current based on at least information associated with the detected magnitude of the switching frequency of the first signal;
 a first comparator configured to receive a predetermined threshold voltage and a first voltage and generate a first comparison signal, the first voltage being a sum of a second voltage and a third voltage; and
 a gate driver configured to output a drive signal to a switch based on at least information associated with the first comparison signal in order to affect a second current flowing through a primary winding coupled to a secondary winding;
 wherein, if the first voltage is larger than the predetermined threshold voltage in magnitude, the drive signal causes the switch to open;

wherein:
the drive signal is associated with the switching frequency;
the second voltage increases with the increasing first current in magnitude and decreases with the decreasing first current in magnitude; and
the third voltage increases with the increasing second current in magnitude and decreases with the decreasing second current in magnitude;
wherein the first current decreases in response to the increasing switching frequency in magnitude and increases in response to the decreasing switching frequency in magnitude.

6. The system of claim 5 wherein the first current decreases linearly with the increasing switching frequency in magnitude and increases linearly with the decreasing switching frequency in magnitude.

7. The system of claim 5 wherein the second voltage is proportional with the first current in magnitude.

8. The system of claim 5 wherein the third voltage is proportional with the second current in magnitude.

9. The system of claim 5 wherein:
the first comparator is further configured to effectively compare an effective threshold voltage and the third voltage; and
the effective threshold voltage is equal to the predetermined threshold voltage minus the second voltage.

10. The system of claim 5 wherein the gate driver is further configured to receive a modulation signal associated with at least the first comparison signal and generate the drive signal based on at least information associated with the modulation signal.

11. The system of claim 5, and further comprising:
a signal generator configured to generate a second signal and one or more third signals; and
a second comparator configured to receive the second signal and a fourth signal and generate a second comparison signal.

12. The system of claim 5, and further comprising:
a flip-flop component configured to receive the first comparison signal and output the first signal to the gate driver;
wherein the gate driver is further configured to receive the first signal, process information associated with the first signal and generate the drive signal based on at least information associated with the first signal.

13. The system of claim 9 wherein the effective threshold voltage increases with the increasing switching frequency in magnitude and decreases with the decreasing switching frequency in magnitude.

14. The system of claim 10 wherein:
the modulation signal is associated with the switching frequency; and
the first signal includes the modulation signal.

15. The system of claim 11 wherein the gate driver is further configured to receive a modulation signal associated with at least the first comparison signal and the second comparison signal and generate the drive signal based on at least information associated with the first comparison signal and the second comparison signal.

16. The system of claim 11 wherein the first signal includes the one or more third signals.

17. The system of claim 13 wherein the effective threshold voltage increases linearly with the increasing switching frequency in magnitude and decreases linearly with the decreasing switching frequency in magnitude.

18. A method for adjusting a threshold of a power converter, the method comprising:
receiving a first signal modulated at a switching frequency;
processing information associated with the first signal;
detecting a magnitude of the switching frequency of the first signal based on at least information associated with the first signal;
generating a threshold signal based on at least information associated with the detected magnitude of the switching frequency of the first signal;
receiving the threshold signal and a second signal;
generating a comparison signal based on at least information associated with the threshold signal and the second signal;
processing information associated with the comparison signal; and
generating a drive signal based on at least information associated with the comparison signal to affect a current flowing through a primary winding coupled to a secondary winding;
wherein, if the second signal is larger than the threshold signal in magnitude, the drive signal causes the current to decrease;
wherein:
the drive signal is associated with the switching frequency;
the second signal increases with the increasing current in magnitude and decreases with the decreasing current in magnitude; and
the threshold signal increases in response to the increasing switching frequency in magnitude and decreases in response to the decreasing switching frequency in magnitude.

19. The method of claim 18 wherein the threshold signal increases linearly with the increasing switching frequency in magnitude and decreases linearly with the decreasing switching frequency in magnitude.

20. A method for adjusting an effective threshold of a power converter, the method comprising:
receiving a first signal modulated at a switching frequency;
processing information associated with the first signal;
detecting a magnitude of the switching frequency of the first signal based on at least information associated with the first signal;
generating a first current based on at least information associated with the detected magnitude of the switching frequency of the first signal;
receiving a predetermined threshold voltage and a first voltage, the first voltage being a sum of a second voltage and a third voltage;
generating a first comparison signal based on at least information associated with the predetermined threshold voltage and the first voltage;
processing information associated with the first comparison signal; and
generating a drive signal based on at least information associated with the first comparison signal to affect a second current flowing through a primary winding coupled to a secondary winding;
wherein, if the first voltage is larger than the predetermined threshold voltage in magnitude, the drive signal causes the second current to decrease;
wherein:
the drive signal is associated with the switching frequency;

the second voltage increases with the increasing first current in magnitude and decreases with the decreasing first current in magnitude; and the third voltage increases with the increasing second current in magnitude and decreases with the decreasing second current in magnitude;

wherein the first current decreases in response to the increasing switching frequency in magnitude and increases in response to the decreasing switching frequency in magnitude.

21. The method of claim 20 wherein the first current decreases linearly with the increasing switching frequency in magnitude and increases linearly with the decreasing switching frequency in magnitude.

22. The method of claim 20 wherein the second voltage is proportional with the first current in magnitude.

23. The method of claim 20 wherein the third voltage is proportional with the second current in magnitude.

24. The method of claim 20 wherein:
the process for generating a first comparison signal includes effectively comparing an effective threshold voltage and the third voltage; and
the effective threshold voltage is equal to the predetermined threshold voltage minus the second voltage.

25. The method of claim 20, and further comprising:
receiving a modulation signal associated with at least the first comparison signal;
wherein the process for generating a drive signal based on at least information associated with the first comparison signal includes generating the drive signal based on at least information associated with the modulation signal.

26. The method of claim 20, and further comprising:
generating a second signal and one or more third signals;
receiving the second signal and a fourth signal; and
generating a second comparison signal based on at least information associated with the second signal and the fourth signal.

27. The method of claim 24 wherein the effective threshold voltage increases with the increasing switching frequency in magnitude and decreases with the decreasing switching frequency in magnitude.

28. The method of claim 25 wherein:
the modulation signal is associated with the switching frequency; and
the first signal includes the modulation signal.

29. The method of claim 26, and further comprising:
receiving a modulation signal associated with at least the first comparison signal and the second comparison signal; and
generating the drive signal based on at least information associated with the first comparison signal and the second comparison signal.

30. The method of claim 27 wherein the effective threshold voltage increases linearly with the increasing switching frequency in magnitude and decreases linearly with the decreasing switching frequency in magnitude.

31. The method of claim 29 wherein the first signal includes the one or more third signals.

* * * * *